US012745135B2

(12) United States Patent
Cui

(10) Patent No.: US 12,745,135 B2
(45) Date of Patent: Sep. 22, 2026

(54) METHOD FOR DATA TRANSMISSION AND COMMUNICATION DEVICE

(71) Applicant: GUANGDONG OPPO MOBILE TELECOMMUNICATIONS CORP., LTD., Dongguan (CN)

(72) Inventor: Shengjiang Cui, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 245 days.

(21) Appl. No.: 18/754,519

(22) Filed: Jun. 26, 2024

(65) Prior Publication Data

US 2024/0349123 A1 Oct. 17, 2024

Related U.S. Application Data

(63) Continuation of application No. PCT/CN2021/141776, filed on Dec. 27, 2021.

(51) Int. Cl.

*H04W 28/16* (2009.01)
*H04L 1/00* (2006.01)
*H04L 5/00* (2006.01)
*H04W 72/0457* (2023.01)

(52) U.S. Cl.

CPC ........... *H04W 28/16* (2013.01); *H04L 1/0002* (2013.01); *H04L 1/0057* (2013.01); *H04L 5/0064* (2013.01); *H04W 72/0457* (2023.01)

(58) Field of Classification Search

CPC ......................... H04W 28/16; H04W 72/0457; H04L 1/0002; H04L 1/0057; H04L 5/0064

See application file for complete search history.

(56) References Cited

U.S. PATENT DOCUMENTS

| | | | |
|---|---|---|---|
| 7,801,236 | B2 | 9/2010 | Tamaki |
| 10,447,425 | B2 | 10/2019 | Lyu |
| 2005/0197065 | A1 | 9/2005 | Tamaki |

(Continued)

FOREIGN PATENT DOCUMENTS

| | | |
|---|---|---|
| CN | 1665166 A | 9/2005 |
| CN | 1976535 A | 6/2007 |

(Continued)

OTHER PUBLICATIONS

"Hinrichs Malte et al: Efficient Line Coding for Low-Power Optical Wireless Communications", 2021 IEEE 94th Vehicular Technology Conference (VTC2021-Fall), IEEE, Sep. 27, 2021 (Sep. 27, 2021), pp. 1-7, XP034042641, DOI:10.1109/VTC2021-FALL52928.2021.9625557, [ retrieved on Nov. 22, 2021], the whole document.

(Continued)

*Primary Examiner* — Brenda H Pham
(74) *Attorney, Agent, or Firm* — BAYES PLLC

(57) ABSTRACT

There is provided a method for data transmission, a communication device and a chip. The method includes that: a communication device determines a first code unit length used for first data and/or a first coding mode used for the first data based on first information. The first information includes at least one of: a first data block size used for the first data, a first code rate used for the first data, or a first bit number corresponding to a first data stream obtained by encoding the first data.

20 Claims, 18 Drawing Sheets

(56) References Cited

U.S. PATENT DOCUMENTS

| | | | | |
|---|---|---|---|---|
| 2012/0183066 | A1* | 7/2012 | Oh | H04N 19/107 375/E7.125 |
| 2017/0019208 | A1 | 1/2017 | Garcia Villegas et al. | |
| 2019/0068313 | A1 | 2/2019 | Lyu | |
| 2020/0092033 | A1 | 3/2020 | Lyu | |
| 2020/0186294 | A1 | 6/2020 | Kawasaki | |
| 2023/0113448 | A1* | 4/2023 | Dai | H04L 1/0057 714/746 |

FOREIGN PATENT DOCUMENTS

| | | | |
|---|---|---|---|
| CN | 109150403 | A | 1/2019 |
| CN | 108243449 | B | 4/2021 |
| WO | 2007125580 | A1 | 11/2007 |

OTHER PUBLICATIONS

Supplementary European Search Report in the European application No. 21969295.1, mailed on Oct. 7, 2025.

International Search Report in the international application No. PCT/CN2021/141776, mailed on Apr. 7, 2022. 6 pages with English translation.

Written Opinion of the International Search Authority in the international application No. PCT/CN2021/141776, mailed on Apr. 7, 2022. 11 pages with English translation.

EPC™ Radio-Frequency Identity Protocols Generation-2 UHF RFID Standard, Specification for RFID Air Interface Protocol for Communications at 860 MHz-960 MHz, Release 2.1, Ratified, Jul. 2018. the whole document. 157 pages.

* cited by examiner

Figure 8:
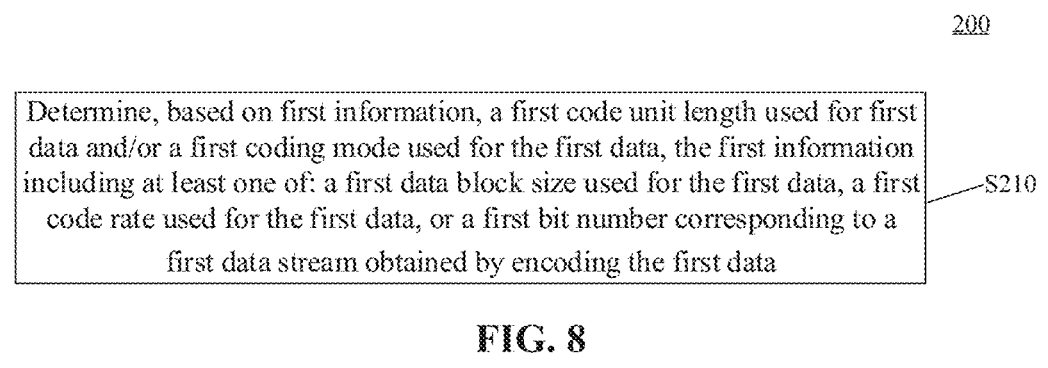

200

Determine, based on first information, a first code unit length used for first data and/or a first coding mode used for the first data, the first information including at least one of: a first data block size used for the first data, a first code rate used for the first data, or a first bit number corresponding to a first data stream obtained by encoding the first data

METHOD FOR DATA TRANSMISSION AND COMMUNICATION DEVICE

CROSS-REFERENCE TO RELATED APPLICATION

This application is a continuation of International Patent Application No. PCT/CN2021/141776 filed on Dec. 27, 2021, the disclosure of which is incorporated by reference in its entirety.

BACKGROUND

With the increasing application demand in the fifth generation (5G) mobile communication technology industry, there are more and more types and application scenarios of connectors, and there will be higher requirements for the price and power consumption of communication terminals. The application of battery-free and low-cost passive Internet of Things (IoT) devices has become the key technology of cellular IoT, which can enrich the types and number of terminals in the network to truly realize the Internet of Everything. The passive IoT devices can be zero-power terminals based on Radio Frequency Identification (RFID), and can be extended on this basis to be suitable for cellular IoT.

Therefore, how to apply the zero-power terminal to the cellular IoT is an urgent technical problem to be solved in this field.

SUMMARY

The present disclosure relates to the technical field of communications, and more particularly to a method for data transmission and a communication device.

Embodiments of the present disclosure provide a method for data transmission and a communication device, so that the cellular IoT is compatible with zero-power terminals, which can not only enrich the types and number of linked terminals in the network to truly realize the Internet of Everything, but also improve the data transmission performance and the integrity of data transmission.

In a first aspect, there is provided a method for data transmission, which is per formed by a communication device and includes following operation.

A first code unit length used for first data and/or a first coding mode used for the first data are determined based on first information.

The first information includes at least one of: a first data block size used for the first data, a first code rate used for the first data, or a first bit number corresponding to a first data stream obtained by encoding the first data.

In a second aspect, the present disclosure provides a communication device including a processor. The processor is configured to perform the method in the first aspect or various implementations thereof.

In a third aspect, the present disclosure provides a chip for implementing the method in the first aspect or various implementations thereof. In particular, the chip includes a processor configured to invoke and run a computer program from a memory to cause a device installed with the chip to perform the method in the first aspect or various implementations thereof.

BRIEF DESCRIPTION OF THE DRAWINGS

FIG. 8 is a schematic flowchart of a method for data transmission according to an embodiment of the present disclosure.

DETAILED DESCRIPTION

Figure 1:
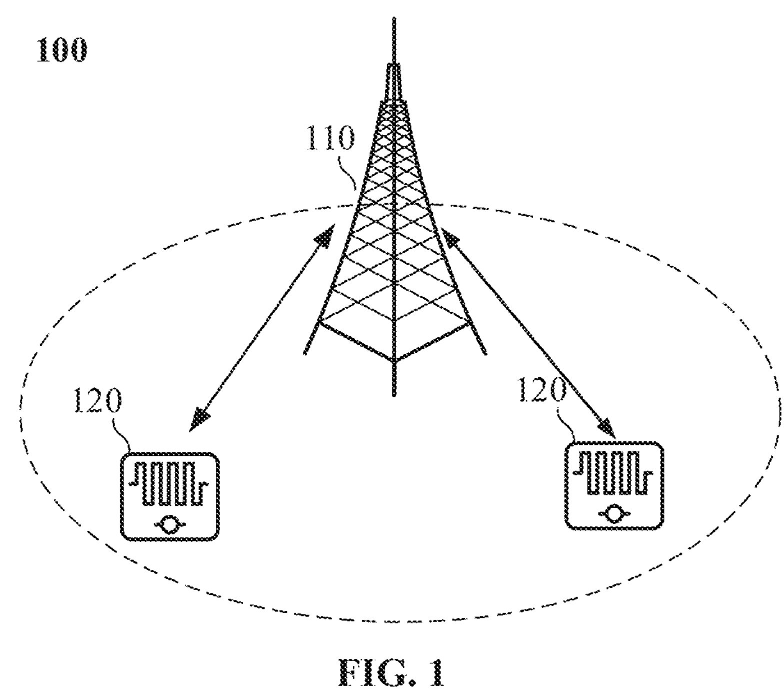
FIG. 1 is a schematic diagram of a communication system according to an embodiment of the present disclosure.

The technical solutions of the embodiments of the present disclosure will be described below in conjunction with the drawings in the embodiments of the present disclosure, and it will be apparent that the described embodiments are part of the embodiments of the present disclosure, but not all of the embodiments of the present disclosure. With respect to the embodiments in the present disclosure, all other embodiments obtained by those of ordinary skill in the art without making creative efforts fall within the scope of protection of the present disclosure.

It should be understood that the terms "system" and "network" herein are often used interchangeably. The term "and/or" herein is only an association relationship describing associated objects, which means that there may be three relationships. For example, "A and/or B" may have three meanings: A exists alone, A and B exist at the same time and B exists alone. In addition, the character "/" herein generally indicates that the associated objects before and after the character "/" are in an "or" relationship. The term "correspondence" herein may mean that there is a direct correspondence or an indirect correspondence relationship between the two, may also mean that there is an association relationship between the two, may also be a relationship between indication and being indicated, configuration and being configured, etc. The term "indication" herein may be a direct indication, an indirect indication, or an indication indicates that there is an association. For example, "A indicates B" means that A directly indicates B. For example, B can be obtained through A. "A indicates B" can also mean that A indirectly indicates B. For example, A indicates C, and B can be obtained by C. "A indicates B" can also indicate that there is an association between A and B. The term "pre-configuration" herein may be achieved by pre-storing corresponding codes, tables, or other means that may be used to indicate related information in a device (e.g., including a terminal device and a network device), the specific implementation of which is not limited in the present disclosure. For example, pre-configuration can refer to being defined in the protocol. It should also be understood that, in the embodiments of the present disclosure, the "protocol" may refer to standard protocols in the communication field, such as LTE protocols, NR protocols, and related protocols applied in future communication systems, which are not limited in the present disclosure.

The embodiments of the present disclosure can be applied to various communication systems, such as: Global System of Mobile communication (GSM) systems, Code Division Multiple Access (CDMA) systems, Wideband Code Division Multiple Access (WCDMA) systems, General Packet Radio Service (GPRS), Long Term Evolution (LTE) systems, Advanced long term evolution (LTE-A) systems, New Radio (NR) systems, evolution systems of NR systems, and LTE-based access to unlicensed spectrum (LTE-U) systems, NR-based access to unlicensed spectrum (NR-U) systems, Universal Mobile Telecommunication Systems (UMTS), Wireless Local Area Networks (WLAN), Wireless Fidelity (WiFi), next generation communication systems, zero-power communication systems, cellular Internet of Things (IoT), cellular passive Internet of Things or other communication systems.

The cellular Internet of Things is the development product of the combination of cellular mobile communication network and Internet of Things. The cellular passive Internet of Things is also called passive cellular Internet of Things, which is a combination of a network device and passive terminals. In the cellular passive Internet of Things, a passive terminal can communicate with other passive terminals through the network device, or the passive terminals can communicate in a Device to Device (D2D) communication mode, while the network device only needs to send carrier signals, that is, power supply signals, to supply power to the passive terminals.

In general, conventional communication systems support a limited number of connections and are easy to implement. However, with the development of communication technologies, mobile communication systems will not only support conventional communication, but also support, for example, D2D communication, Machine to Machine (M2M) communication, Machine Type Communication (MTC), Vehicle to Vehicle (V2V) communication, etc. The embodiments of the present disclosure can also be applied to these communication systems.

Optionally, the communication system in the embodiments of the present disclosure can be applied to a Carrier Aggregation (CA) scenario, a Dual Connectivity (DC) scenario, and a Standalone (SA) network distribution scenario.

The applied spectrum is not limited by the embodiments of the present disclosure. For example, the embodiments of the present disclosure may be applied to a licensed spectrum or an unlicensed spectrum.

Exemplarily, a communication system 100 applied in the embodiments of the present disclosure is illustrated in FIG. 1. The communication system 100 may include a network device 110, which may be a device that communicates with a terminal device 120 (or referred to as a communication terminal or terminal). The network device 110 may provide communication coverage for a particular geographic area and may communicate with terminal devices located within the coverage area.

FIG. 1 exemplarily illustrates one network device and two terminal devices. Optionally, the communication system 100 may include multiple network devices and other numbers of terminal devices may be included within the coverage area of each network device, which is not limited by the embodiments of the present disclosure.

Optionally, the communication system 100 may further include other network entities, such as a network controller, a mobility management entity and the like, which are not limited by the embodiments of the present disclosure.

It should be understood that a device having a communication function in a network/system in the embodiments of the present disclosure may be referred to as a communication device. Taking the communication system 100 illustrated in FIG. 1 as an example, the communication device may include a network device 110 and terminal devices 120 that have a communication function, and the network device 110 and the terminal devices 120 may be specific devices described above and will not be described here. The communication device may further include other devices in the communication system 100, such as a network controller, a mobility management entity and other network entities, which are not limited in the embodiments of the present disclosure.

The embodiments of the present disclosure describe various embodiments in connection with the terminal device and the network device. The network device may be a device for communicating with a mobile device, the network device may be an Access Point (AP) in a WLAN, a Base Transceiver Station (BTS) in a GSM or in a CDMA, a base station (NodeB, NB) in a WCDMA system, an Evolutional Node B (eNB or eNodeB) in a LTE, or a relay station or an Access Point, or a network device (gNB) in a vehicle-mounted device, a wearable device and an NR network or a network device in a future evolved Public Land Mobile Network (PLMN), etc.

In the embodiments of the present disclosure, the network device provides services for a cell, and the terminal device communicates with the network device through transmission resources (e.g., frequency domain resources, or spectrum resources) used by the cell. The cell may be a cell corresponding to the network device (e.g., base station), and the cell may belong to a macro base station or a base station corresponding to a Small cell. The Small cell may include a Metro cell, a Micro cell, a Pico cell, a Femto cell, etc. These Small cells have the characteristics of small coverage and low transmission power, and are suitable for providing high-speed data transmission services.

In the embodiments of the present disclosure, a terminal device may also be referred to as a User Equipment, an access terminal, a subscriber unit, a subscriber station, a mobile station, a mobile platform, a remote terminal, a mobile device, a user terminal, a terminal, a wireless communication device, a user agent or a user apparatus, etc. The terminal device may be a STAION (ST) in a WLAN, a cellular telephone, a cordless telephone, a Session Initiation Protocol (SIP) telephone, a Wireless Local Loop (WLL) station, a Personal Digital Assistant (PDA) device, a handheld device having a wireless communication function, a computing device or other processing devices connected to a wireless modem, a vehicle-mounted device, a wearable device, and a next generation communication system, such as a terminal device in an NR network or a terminal device in a future evolved PLMN, or a zero-power device.

By way of example but not limitation, in the embodiments of the present disclosure, the terminal device may also be a wearable device. The wearable device can also be called a wearable intelligent device, which is a general name of wearable devices (such as glasses, gloves, watches, clothing and shoes) developed by intelligently designing daily wear by applying wearable technologies. The wearable device is a portable device that is worn directly on the body or integrated into the user's clothes or accessories. The wearable device is not only a kind of hardware device, but also realizes powerful functions through software support, data interaction and cloud interaction. The generalized wearable smart device includes devices that have full functions and a large size, which can realize complete or partial functions without relying on smart phones, such as smart watches or smart glasses. In addition, the generalized wearable smart device further includes devices that only focus on a certain kind of application function, which need to be used in conjunction with other devices, such as smart phones, such as various smart bracelets and smart jewelry for monitoring physical signs.

It should be understood that a zero-power device can be understood as a device whose power consumption is lower than preset power consumption. For example, the zero-power device includes passive terminals and even includes semi-passive terminals.

Exemplarily, the zero-power device is a Radio Frequency Identification (RFID) tag, which is a technology for realizing contactless automatic transmission and identification of tag information by means of spatial coupling of radio frequency signals. The RFID tag is also called "radio frequency tag" or "electronic tag". According to different power supply modes, the electronic tag can be divided into different types, which may be an active electronic tag, a passive electronic tag and a semi-passive electronic tag. The active electronic tag, also known as initiative electronic tag, means that the working power of the electronic tag is provided by battery, and the battery, memory and antenna together form the active electronic tag. Different from the passive radio frequency activation mode, the active electronic tag sends information through set frequency band before battery replacement. The passive electronic tag, also known as inactive electronic tag, does not support a built-in battery. When the passive electronic tag approaches a reader, the tag is in the near field range formed by the radiation of an antenna of the reader. An antenna of the electronic tag generates an induced current through electromagnetic induction, and the induced current drives a chip circuit of the electronic tag. The chip circuit sends the identification information stored in the tag to the reader through the antenna of the electronic tag. The semi-passive electronic tag, also known as semi-initiative electronic tag, inherits the advantages of small size, light weight, low price and long service life of the passive electronic tag. The semi-passive electronic tag only provides power for a few circuits in the chip through its built-in battery when it is not accessed by the reader, and only when it is accessed by the reader, the RFID chip is powered by the built-in battery, so as to increase the reading and writing distance of the tag and thus improve the reliability of communication.

An RFID system is a wireless communication system. The RFID system is composed of two parts: an electronic tag and a Reader/Writer. The electronic tag includes coupling components and chips. Every electronic tag has a unique electronic code, which is placed on the measured target to mark the target object. The reader/writer cannot only read the information on the electronic tag, but also write the information on the electronic tag, and at the same time provide the power needed for communication for the electronic tag.

Zero-power communication adopts technologies of power harvesting and back scattering communication. In order to understand the technical solutions of the embodiments of the present disclosure, the related zero-power technology is explained.

Figure 2:
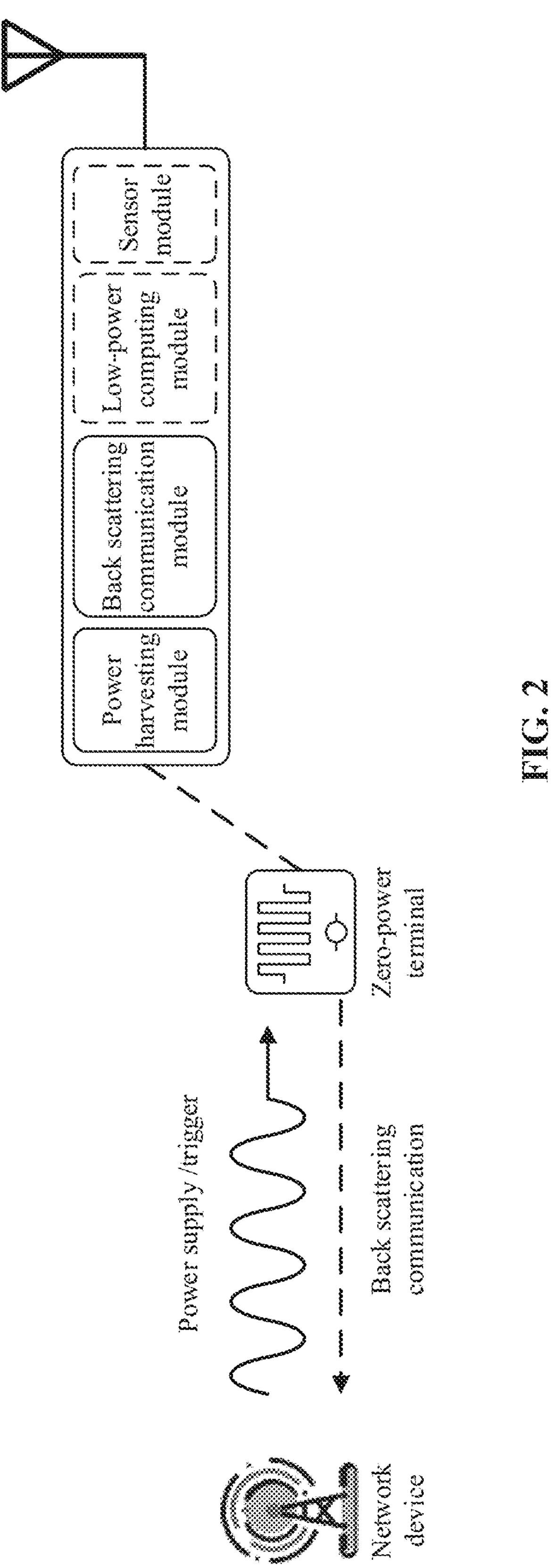
FIG. 2 is a schematic diagram of a zero-power communication system according to the present disclosure.

FIG. 2 is a schematic diagram of a zero-power communication system according to the present disclosure.

As illustrated in FIG. 2, the zero-power communication system consists of a network device and a zero-power terminal. The network device is used to send wireless power supply signals and downlink communication signals to the zero-power terminal and receive back scattering signals from the zero-power terminal. A basic zero-power terminal includes a power harvesting module, a back scattering communication module and a low power computing module. In addition, the zero-power terminal can further have a memory or a sensor for storing some basic information (such as, article identification, etc.) or obtaining sensing data, such as ambient temperature and ambient humidity.

The zero-power communication can also be called zero-power terminal-based communication. The key technologies of the zero-power communication mainly include Radio Frequency (RF) power harvesting and back scattering communication.

1. RF Power Harvesting

Figure 3:
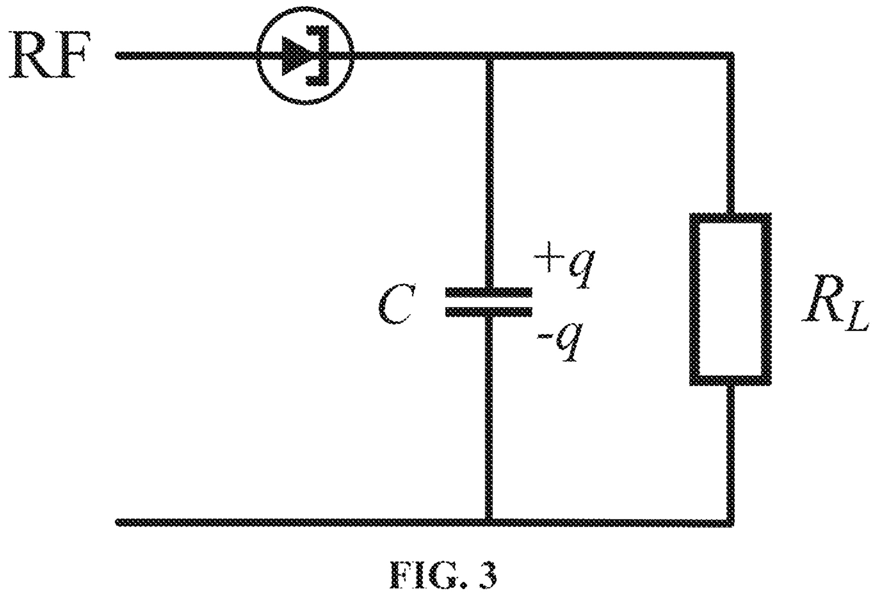
FIG. 3 is a principle diagram of power harvesting according to an embodiment of the present disclosure.

FIG. 3 is a principle diagram of power harvesting according to an embodiment of the present disclosure.

As illustrated in FIG. 3, the power harvesting module can include a capacitor C and a resistor $R_L$. The power harvesting module harvests spatial electromagnetic wave power based on the principle of electromagnetic induction, and then obtains the power required to drive the zero-power terminal to work, such as driving the low-power demodulation and modulation module, sensors and memory reading. Therefore, the zero-power terminal does not need a conventional battery. The principle of electromagnetic induction means that as long as the magnetic flux passing through the closed circuit changes, the induced current will be generated in the closed circuit. Combined with the present disclosure, the capacitor C and the resistor $R_L$ can be used to form a closed circuit. After receiving the radio frequency (RF), the radio frequency power harvesting module can generate an induced current and store the generated induced current in the capacitor C to realize the harvesting of spatial electromagnetic wave power.

2. Back Scattering Communication

Figure 4:
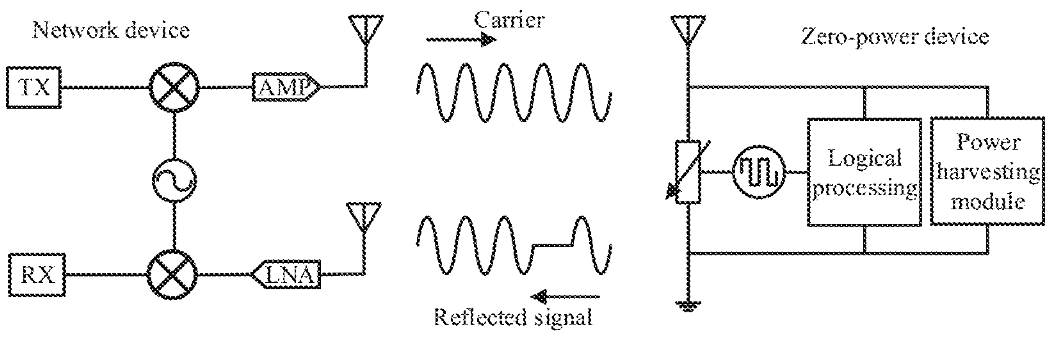
FIG. 4 is a principle diagram of back scattering communication according to the present disclosure.

FIG. 4 is a principle diagram of back scattering communication according to the present disclosure.

As illustrated in FIG. 4, when a network device acts as a sending end (TX), the network device sends a carrier to a zero-power device through an amplifier (AMP). Accordingly, after receiving the carrier sent by the network, the zero-power device uses the power harvested by the power harvesting module to drive a logic processing module and a modulation module to process and modulate the carrier, and loads, through a variable resistor, the information needed to be sent and radiates the modulated reflected signal from the antenna. This information transmission process is called back scattering communication. Accordingly, when the network device acts as a receiving end (RX), the reflected signal sent by the zero-power device can be received by a low noise amplifier (LNA). Further, in some possible implementations, the AMP and the LNA may each be connected with a voltage display lamp, and an emergency lamp may be provided between the voltage display lamps respectively connected to the AMP and LNA.

It should be noted that the principle of the back scattering communication illustrated in FIG. 4 is explained based on the zero-power device and the network device, and in practice, any device having a function of back scattering communication can realize back scattering communication.

The functions of back scattering communication and load modulation are inseparable. The load modulation adjusts and controls the circuit parameters of the oscillation loop of the zero-power terminal according to the clock of the data stream, so that the size and the phase of impedance of the zero-power device are changed accordingly, and thus the modulation process is completed. The technology of the load modulation mainly includes two methods: resistance-based load modulation and capacitance-based load modulation.

Figure 5:
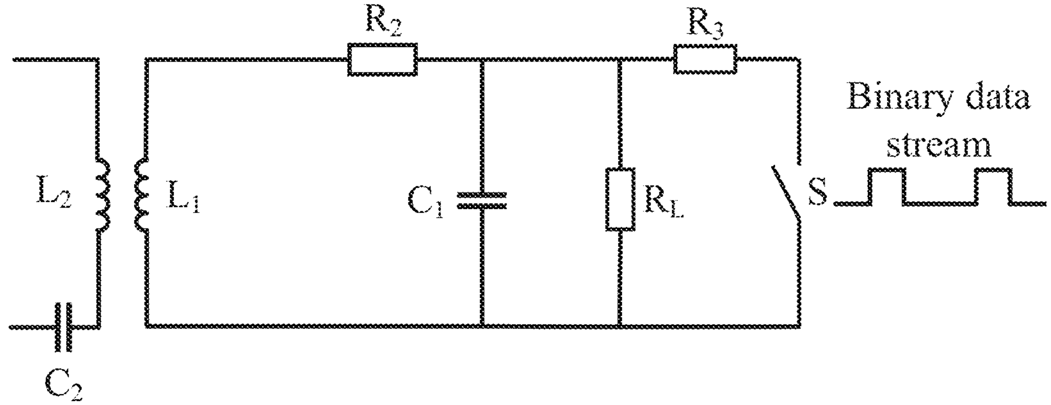
FIG. 5 is a circuit diagram of resistance-based load modulation according to an embodiment of the present disclosure.

FIG. 5 is a circuit diagram of resistance-based load modulation according to an embodiment of the present disclosure.

As illustrated in FIG. 5, in resistance-based load modulation, the resistor $R_L$ is connected in parallel with a resistor $R_3$. The resistor $R_L$ can be called a load modulation resistor. The resistor $R_L$ is switched on or switched off based on the control of binary data stream. The switching on and off of the resistor $R_L$ will lead to the change of circuit voltage. Further, the resistor $R_L$ can be connected in parallel with an inductor $L_1$ through a resistor $R_2$, and the inductor $L_1$ is used to form a resonant circuit with an inductor $L_2$. Based on this, the switching on and off of the load modulation resistor will lead to the change of circuit voltage, which will lead to the change of resonant frequency of the resonant circuit, and finally realize amplitude keying (ASK) modulation. That is, signal modulation and transmission are realized by adjusting the amplitude of back scattering signal of the zero-power terminal. Further, the inductor $L_2$ can also be connected to a capacitor $C_2$, which can be used to convert a change in the resonant frequency of the resonant circuit into a signal for transmission by the antenna. Similarly, in the capacitor-based load modulation, the change of the resonant frequency of the resonant circuit can be realized by switching on and off the capacitor C1 in order to realize frequency keying (FSK) modulation. That is, the signal modulation and transmission are realized by adjusting the working frequency of the back scattering signal of the zero-power terminal.

Because the zero-power terminal modulates incoming signals by means of load modulation and performs the back scattering communication process, the zero-power terminal has following significant advantages.

1. The terminal device does not actively emit signals, and realizes back scattering communication by modulating incoming signals.
2. The terminal device does not rely on the traditional active power amplifier transmitter, and uses a low power computing unit to greatly reduce the complexity of hardware.
3. Battery-free communication can be realized by combining power harvesting.

It should be understood that the terminal device may be a zero-power device (such as a passive terminal, or even a semi-passive terminal), or even the terminal device may be a non-zero-power device, such as an ordinary terminal, but the ordinary terminal may perform back scattering communication in some cases.

In the specific implementation, the data transmitted by the terminal device can use different forms of codes to represent binary "1" and "0". Radio frequency identification systems generally use one of the following coding modes: reverse non-return-to-zero (NRZ) coding, Manchester coding, Unipolar RZ coding, differential bi-phase (DBP) coding, Miller coding and differential coding. Generally speaking, 0 and 1 are represented by use of different pulse signals.

Exemplarily, the zero-power terminal may be divided into the following types based on the power source and usage mode of the zero-power terminal.

1. Passive Zero-Power Terminal

The zero-power terminal does not need a built-in battery. When the zero-power terminal approaches the network device (such as the reader of the RFID system), the zero-power terminal is in the near-field range formed by the radiation of the antenna of the network device. Therefore, an antenna of the zero-power terminal generates an induced current through electromagnetic induction, and the induced current drives the low power chip circuit of the zero-power terminal, so that demodulation of signals in the forward link and modulation of signals in the backward link are realized. For back scattering link, the zero-power terminal uses the back scattering implementation for signal transmission.

It can be seen that the passive zero-power terminal does not need the built-in battery to drive either the forward link or the backward link, so it is a true zero-power terminal. The passive zero-power terminal does not need the battery, and the RF circuit and the baseband circuit of the passive zero-power terminal are very simple. For example, a Low Noise Amplifier (LNA), a Power Amplifier (PA), a crystal oscillator, an Analog to Digital Converter (ADC) and the like are not required by the passive zero-power terminal, and thus the passive zero-power terminal has many advantages, such as small size, light weight, very cheap price and long service life.

2. Semi-Passive Zero-Power Terminal

The semi-passive zero-power terminal itself is not installed with conventional batteries, but it can harvest radio wave power using an RF power harvesting module and store the harvested power in a power storage unit (such as, a capacitor). After obtaining energy, the power storage unit may drive the low power chip circuit of the zero-power terminal, so that demodulation of signals in the forward link signal and modulation of signals in the backward link signal are realized. For back scattering link, the zero-power terminal uses the back scattering implementation for signal transmission.

It can be seen that the semi-passive zero-power terminal does not need the built-in battery to drive either the forward link or the backward link. Although the power stored by capacitors is used in the work, the power comes from the radio power harvested by the power harvesting module, so it is also a true zero-power terminal. The semi-passive zero-power terminal inherits many advantages of the passive zero-power terminal, so it has many advantages such as small size, light weight, very cheap price and long service life.

3. Active Zero-Power Terminal

In some scenarios, the zero-power terminal used can also be an active zero-power terminal, which can have the built-in battery. The battery is used to drive a low power chip circuit of the zero-power terminal, so that demodulation of signals in the forward link and modulation of signals in the backward link are realized. However, for the back scattering link, the zero-power terminal uses the back scattering implementation for signal transmission. Therefore, the zero-power of this kind of terminal is mainly reflected in the fact that the signal transmission on the backward link does not need the power of the terminal itself, but uses the way of back scattering. That is to say, the active zero-power terminal supplies power to the RFID chip through the built-in battery, so as to increase the reading and writing distance of the zero-power terminal and improve the reliability of communication. Therefore, the active zero-power terminal can be applied in some scenarios with relatively high requirements on communication distance and reading delay.

Exemplarily, the zero-power terminal may perform power harvesting based on the power supply signal.

Optionally, from the perspective of the carrier of the power supply signal, the power supply signal can be a base station, a smart phone, an intelligent gateway, a charging station, a micro base station, etc.

Optionally, from the perspective of the frequency band, the power supply signal can be a low frequency signal, an intermediate frequency signal, a high frequency signal, etc.

Optionally, from the perspective of the waveform, the power supply signal may be a sine wave, a square wave, a triangular wave, a pulse, a rectangular wave, etc.

Optionally, the power supply signal may be a continuous wave or a discontinuous wave (i.e., a certain time interruption is allowed).

Optionally, the power supply signal can be a signal specified in the 3GPP standard. For example, the power supply signal can be a Sounding Reference Signal (SRS), a Physical Uplink Shared Channel (PUSCH), a Physical Random Access Channel (PRACH), a Physical Uplink Control Channel (PUCCH), a Physical Downlink Control Channel (PDCCH), a Physical Downlink Shared Channel (PDSCH), a Physical Broadcast Channel (PBCH), etc.

It should be noted that since the above carrier signal sent by the network device can also be used to provide power to the zero-power device, the carrier signal can also be called power supply signal.

Exemplarily, the zero-power terminal may perform back scattering communication based on the received trigger signal. Optionally, the trigger signal may be used to schedule or trigger the zero-power terminal to perform the back scattering communication. Optionally, the trigger signal carries the scheduling information of the network device, or the trigger signal is scheduling signaling or a scheduling signal sent by the network device.

Optionally, from the perspective of the carrier of the power supply signal, the trigger signal can be a base station, a smart phone, an intelligent gateway, etc.

Optionally, from the perspective of the frequency band, the trigger signal can be a low frequency signal, an intermediate frequency signal, a high frequency signal, etc.

Optionally, from the perspective of the waveform, the trigger signal may be a sine wave, a square wave, a triangular wave, a pulse, a rectangular wave, etc.

Optionally, the trigger signal may be a continuous wave or a discontinuous wave (i.e., a certain time interruption is allowed).

Optionally, the trigger signal may be a signal specified in the 3GPP standard. Such as, an SRS, a PUSCH, a PRACH, a PUCCH, a PDCCH, a PDSCH, a PBCH and so on. The trigger signal may also be a new signal.

It should be noted that the power supply signal and the trigger signal can be one signal or two independent signals, which are not specifically limited in the present disclosure.

For example, in cellular networks, because the zero-power device is not powered by batteries, it is necessary to provide power supply signals through the network device for the zero-power devices to obtain power, so as to carry out corresponding communication processes. The signal for power supply (i.e., power supply signal) and the signal for information transmission (i.e., trigger signal) can be two signals or one signal. For another example, in RFID technology, the power supply signal and the trigger signal may be one signal, and in cellular passive Internet of Things technology, the power supply signal and the trigger signal may be two independent signals. These two signals may not be sent in the same frequency band. For example, the network device continuously or intermittently sends power supply signals in a certain frequency band, and the zero-power device harvests power. After the zero-power device obtains power, the zero-power device can carry out corresponding communication processes, such as measurement, channel/signal reception, channel/signal transmission and so on.

When performing the sending of the signal, the zero-power device can send the signal on preset resources. For example, different resources may be adopted for different user Identifications (IDs) or different user types. The zero-power device can also send the signal based on the scheduling of the network device. That is, the zero-power device can receive a trigger signal and perform signal transmission based on the scheduling of the trigger signal.

Figure 6:
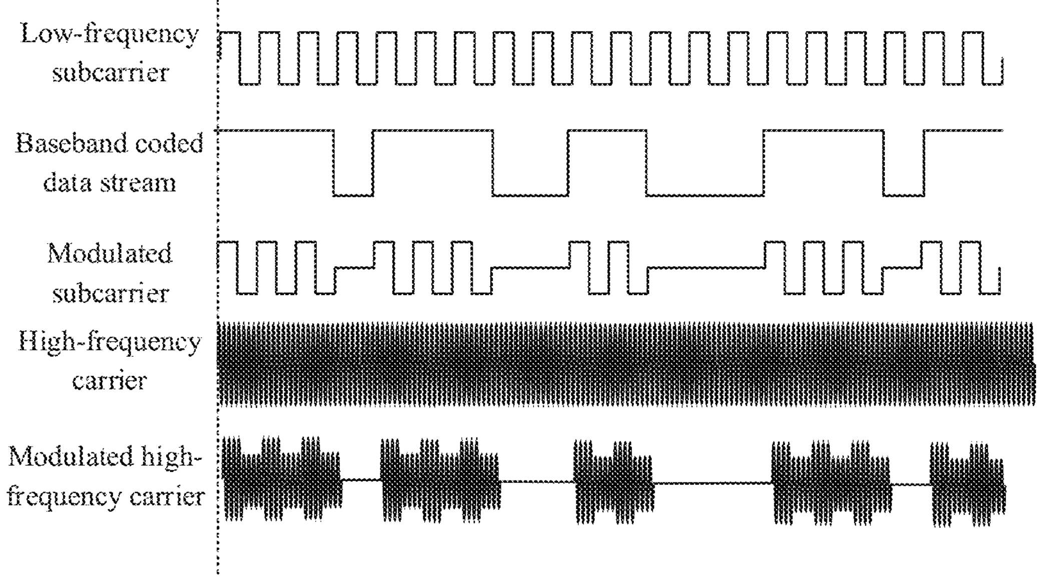
FIG. 6 is a schematic diagram of a subcarrier modulation scheme according to an embodiment of the present disclosure.
Figure 7:
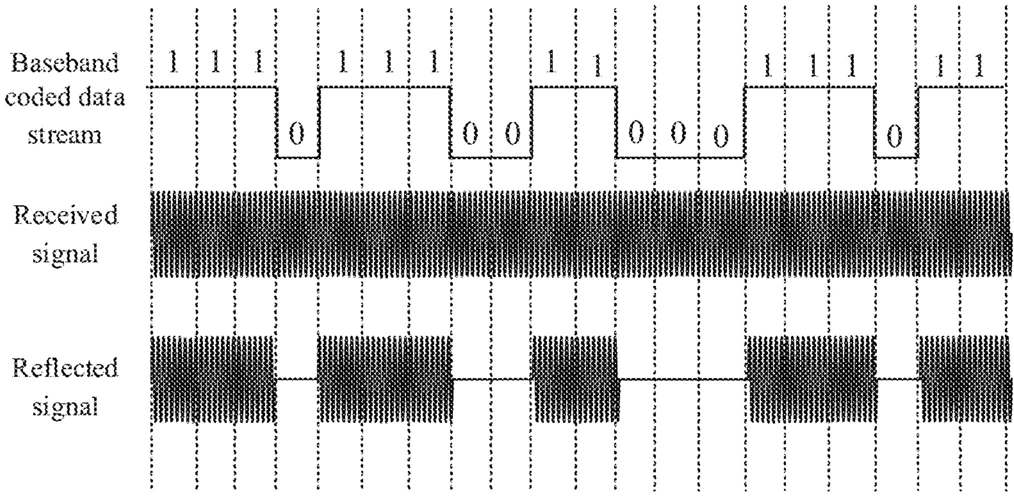
FIG. 7 is a schematic diagram of an on off keying (OOK) modulation scheme according to an embodiment of the present disclosure.

Because the zero-power device cannot generate high-frequency signals, a subcarrier modulation scheme or an On-Off Keying (OOK) modulation scheme is used in backward link to modulate the coded baseband coded data stream. FIG. 6 is a schematic diagram of a subcarrier modulation scheme according to an embodiment of the present disclosure. As illustrated in FIG. 6, for the subcarrier modulation scheme, the zero-power device first generates a low-frequency subcarrier, and then modulates the coded baseband coded data stream on the low-frequency subcarrier to obtain a modulated subcarrier. After that, the modulated subcarrier is modulated on the high frequency carrier by means of load modulation to obtain the modulated high frequency carrier. FIG. 7 is a schematic diagram of an OOK modulation scheme according to an embodiment of the present disclosure. As illustrated in FIG. 7, for the OOK modulation scheme, the zero-power device modulates the coded baseband coded data stream on the signal received by the zero-power device to obtain a reflected signal, and transmits the transmitted signal to the network device. The signal received by the zero-power device can be the high-frequency signal or a specific carrier signal.

With the increasing application demand in the 5G mobile communication technology industry, there are more and more types and application scenarios of connectors, and there will be higher requirements for the price and power consumption of communication terminals. The application of battery-free and low-cost passive Internet of Things (IoT) devices has become the key technology of cellular IoT, which can enrich the types and number of terminals in the network to truly realize the Internet of Everything. The passive IoT devices can be existing zero-power terminals based on the Radio Frequency Identification (RFID) technology for example, and can be extended on this basis to be suitable for cellular IoT.

In actual network deployment, a technical bottleneck faced by the technology of the passive zero-power communication is the limited coverage distance of the forward link, which is mainly due to the fact that the communication distance of the forward link is limited by the signal strength of wireless signals reaching the zero-power terminal. Based on the above implementation technology, the zero-power terminal generally needs to consume 10 microwatts (uw) of power to drive a low power circuit. This means that the signal power reaching the zero-power terminal needs to be at least −20 dBm. Limited by the requirements of radio supervision, the transmission power of the network device is generally not too large. For example, in an Industrial Scientific Medical (ISM) band where RFID works, the maximum transmission power is 30 dBm. Therefore, considering the radio propagation loss in space, the transmission distance of the passive zero-power terminal is generally in the range of 10 m to tens of meters.

The semi-passive zero-power terminal has the potential to significantly expand the communication distance, because the semi-passive zero-power terminal can use the RF power harvesting module to harvest radio waves, so the semi-passive zero-power terminal can continuously acquire radio power and store the acquired radio power in the power storage unit. After obtaining enough power, the power storage unit can drive the low-power circuit to work, so as to realize signal demodulation of the forward link and signal modulation of the backward link. Therefore, in this case, the semi-passive zero-power terminal is equivalent to an active terminal, and downlink coverage of the active terminal depends on the receiver sensitivity of the downlink signal (usually far below the RF power harvesting threshold). Based on the current technology, the power harvesting module can harvest power and input electric power to the power storage unit when the received radio signal strength is not lower than −30 dBm. Therefore, the coverage of the forward link of the semi-passive zero-power terminal depends on the RF power harvesting threshold (e.g., −30 dBm). Compared with the passive zero-power terminal, the received radio signal strength is relaxed from −20 dBm to −30 dBm, so that a link budget gain of 10 dB can be obtained, and therefore the downlink coverage can be improved by more than 3 times. However, while improving the coverage of forward link, semi-passive zero-power terminals also face the problem of decreasing charging efficiency. With the decrease of the received signal strength, the power that can be harvested and stored by the power harvesting module is greatly reduced. For example, when the received signal strength is −30 dBm, that is, 1 microwatt, the power that can be harvested and stored is far less than 1 microwatt (the power harvesting efficiency is greatly reduced).

On the other hand, as mentioned earlier, the low power circuit of the zero-power terminal may need to consume an average power of microwatts (uw).

It can be seen from two aspects that because the terminal device needs to perform power harvesting, and when the distance between the terminal device and the network device is large, the speed of obtaining and storing power through power harvesting is very slow. In addition, for the terminal device close to the network device, even if the terminal device performs back scattering communication at a higher rate, the data transmission performance can be guaranteed. However, if the terminal device far away from the network device performs back scattering communication at a higher rate, the block error rate (BLER) will be too large, so that the transmission times of Hybrid Automatic Repeat Request (HARQ) is increased, and thus the performance of data transmission is reduced.

Based on this, the embodiments of the present disclosure provide a method for data transmission and a communication device, which can not only apply the zero-power terminal to the cellular Internet of Things to enrich the types and number of linked terminals in the network to truly realize the Internet of Everything, but also facilitate improvement of the data transmission performance.

It should be noted that the solutions according to the present disclosure are not only applicable to zero-power scenarios, but also are applicable to non-zero-power scenarios, that is, applicable to the data transmission process between the terminal device and the network device, such as the process of sending data by the terminal device or the process of receiving data by the network device. In addition, the solutions according to the present disclosure are also applicable to the initial access process, such as the process of sending data by the terminal device or the process of receiving data by the network device, which is not specifically limited in the present disclosure.

FIG. 8 is a schematic flowchart of a method 200 for data transmission according to an embodiment of the present disclosure. The method 200 may be performed by a communication device. The communication device may be a terminal device or a network device. For example, the communication device may be the terminal device 120 or the network device 110 as illustrated in FIG. 1. For another example, the communication device may be a zero-power terminal or a network device.

As illustrated in FIG. 8, the method may include the following operation.

In an operation S210, the communication device determines, based on first information, a first code unit length used for first data and/or a first coding mode used for the first data. The first information includes at least one of: a first data block size used for the first data, a first code rate used for the first data, or a first bit number corresponding to a first data stream obtained by encoding the first data.

In the embodiment, the communication device determines, based on first information, a first code unit length used by first data and/or a first coding mode used by the first data, and the first information is designed to include at least one of: a first data block size used for the first data, a first code rate used for the first data, or a first bit number corresponding to a first data stream obtained by encoding the first data, which is equivalent that the cellular IoT is enabled to be compatible with the communication mode of the zero-power terminal. That is, the cellular IoT is enabled to be compatible with the zero-power terminal, which can enrich the type and number of linked terminals in the network, so as to truly realize the Internet of Everything.

In addition, the communication device determines, based on first information, a first code unit length used for first data and/or a first coding mode used for the first data, which is equivalent that the first coding mode and/or the first code unit length are associated with the first information. When the first data block sizes, the first code rates or the first bit numbers are different, the first code unit lengths and/or the first coding modes determined by the communication device based on the first data block sizes, the first code rates or the first bit numbers may be different. That is to say, the communication device can adaptively adjust the first code unit length and/or the first coding mode based on the first information, which facilitates improvement of the reliability of data transmission or data transmission rate and facilitates the interference deletion processing at a receiving end, thereby improving the data transmission performance and the integrity of data transmission.

For example, when a channel condition is poor, the first code rate is small, the first data block size is small or the first bit number is small, the first code unit length is adaptively adjusted to a larger code unit length based on the first information and/or the first coding mode is adaptively adjusted to a coding mode with higher reliability based on the first information, so as to improve the reliability of data transmission. When the channel condition is good, the first code rate is large, the first data block size is large or the first bit number is large, the first code unit length is adaptively adjusted to a smaller code unit length based on the first information and/or the first coding mode is adaptively adjusted to a coding mode with a higher transmission rate based on the first information, so as to improve the data transmission rate. That is, when the communication device adaptively adjusts the first code unit length and/or the first coding mode based on the first information, the reliability of data transmission or data transmission rate is adaptively improved and the interference deletion processing at a receiving end is facilitated, thereby improving the data transmission performance and the integrity of data transmission.

For another example, when a channel condition is poor, the first code rate is small, the first data block size is small or the first bit number is small, the first code unit length is adaptively adjusted to a larger code unit length based on the first information and/or the first coding mode is adaptively adjusted to a coding mode with a higher transmission rate based on the first information, so as to further improve the data transmission rate. When the channel condition is good, the first code rate is large, the first data block size is large or the first bit number is large, the first code unit length is adaptively adjusted to a larger code unit length based on the first information and/or the first coding mode is adaptively adjusted to a coding mode with higher reliability based on the first information, so as to further improve the reliability of data transmission. That is, when the communication device adaptively adjusts the first code unit length and/or the first coding mode based on the first information, the reliability of data transmission or data transmission rate is adaptively improved and the interference deletion processing at a receiving end is facilitated, thereby improving the data transmission performance and the integrity of data transmission.

It should be noted that the communication device can support multiple code unit lengths and/or multiple coding modes. The multiple code unit lengths include the first code unit length, and the multiple coding modes include the first coding mode.

In addition, the first coding mode and the first code unit length are not specifically limited in the present disclosure.

Exemplarily, the first coding mode includes, but is not limited to, several commonly used coding algorithms described above. For example, the NRZ coding, the unipolar return-to-zero coding, the Manchester coding, the Miller coding, the DBP coding, the differential coding, the Pulse Interval Encoding (PIE) coding and so on.

Exemplarily, the first code unit length may be a time length corresponding to one code unit. Optionally, a length corresponding to one code unit may refer to a length of one code unit used to carry one bit of information. For example, taking FIG. 6 as an example, the length of one code unit may refer to a time length of one bit of information on a baseband coded data stream, a time length, corresponding to one bit of information, on the modulated subcarrier, or a time length, corresponding to one bit of information, on the modulated high frequency carrier. For another example, taking FIG. 7 as an example, the length of one code unit may refer to a time length of one bit of information on a baseband coded data stream or a time length, corresponding to one bit of information, on the reflected signal. For another example, for the NRZ coding, the unipolar return-to-zero coding, the Manchester coding, the Miller coding, the DBP coding, the differential coding, etc., one code unit can be used to carry one bit of information. For another example, for the PIE coding mode, the number of code units used for different bit information is different, that is, there is a situation that multiple code units carry one bit of information. That is, for the PIE coding, the speed of back scattering signals is low. Of course, in other alternative embodiments, the code unit may also be referred to as a code chip, a symbol or a frame, or the code unit length may also be referred to as a code unit time length or the like, which is not specifically limited in the present disclosure.

In addition, the implementation of the first data block size and the first data stream is not specifically limited in the present disclosure.

Exemplarily, the first data block size may be a size of a data block to be transmitted or a size of a bit stream before encoding. For example, the first data block size may be the bit number of a bit stream before encoding. For example, the first data block size may be the bit number of the first data before encoding. The unit of the first data block size may be bit, kilobit, etc. Of course, in other alternative embodiments, the first data block size may also be referred to as the first transport block size or the first code block size.

Exemplarily, the first data stream may be an actually sent bit stream or an encoded bit stream, i.e., the first bit number may be the number of bits in the encoded bit stream, or the first data stream may be a bit stream after rate matching. For example, the first bit number may be the number of bits in a bit stream obtained by encoding the first data. For example, the first bit number may be the number of bits to be sent when no rate matching is performed on the first data. When rate matching is performed on the first data, the first bit number may be the number of encoded bits or the number of encoded bits after rate matching, which is not specifically limited in the present disclosure. The unit of the first bit number may be bit, kilobit, etc. Of course, in other alternative embodiments, the first data stream may also be referred to as a baseband coded data stream, and the first bit number may also be referred to as the number of bits in the baseband coded data stream, e.g., the first data stream may be the baseband coded data stream illustrated in FIG. 6 or FIG. 7, and correspondingly, the first bit number may be the number of bits in the baseband coded data stream illustrated in FIG. 6 or FIG. 7.

In addition, the first data is not specifically limited in the present disclosure.

Exemplarily, the first data may be data to be sent by the terminal device, and the first data may be data before encoding. The first data may also be referred to as a first data package, e.g., the first data may be a Media Access Control (MAC) Control Element (CE) Protocol Data Unit (PDU).

In some embodiments, the S210 may include the following operation.

When the first information includes the first data block size, a first data block size group to which the first data block size belongs is determined.

A code unit length corresponding to the first data block size group is determined as the first code unit length based on a first mapping relationship, and/or a coding mode corresponding to the first data block size is determined as the first coding mode based on the first mapping relationship. The first mapping relationship includes a corresponding relationship between each of at least one data block size group and a respective code unit length and/or a respective coding mode, and the at least one data block size group includes the first data block size group.

In this embodiment, when the first information includes the first data block size, it is equivalent that the first code unit length and/or the first coding mode are associated with the first data block size. That is, the communication device can adaptively adjust the first code unit length and/or the first coding mode based on the first data block size, and then adaptively improve the reliability of data transmission or data transmission rate based on the first data block size, which facilitates improvement of the data transmission performance.

For example, when a channel condition is poor or the first data block size is small, the first code unit length is adaptively adjusted to a larger code unit length based on the first data block size, and/or the first coding mode is adaptively adjusted to a coding mode with higher reliability based on the first data block size, so as to improve the reliability of data transmission. When the channel condition is good or the first data block size is large, the first code unit length is adaptively adjusted to a smaller code unit length based on the first data block size, and/or the first coding mode is adaptively adjusted to a coding mode with a higher transmission rate based on the first data block size, so as to improve the data transmission rate. That is, when the communication device adaptively adjusts the first code unit length and/or the first coding mode based on the first data block size, the reliability of data transmission or data transmission rate is adaptively improved and the interference deletion processing at a receiving end is facilitated, thereby improving the data transmission performance and the integrity of data transmission.

For another example, when a channel condition is poor or the first data block size is small, the first code unit length is adaptively adjusted to a larger code unit length and/or the first coding mode is adaptively adjusted to a coding mode with a higher transmission rate based on the first data block size, so as to further improve the data transmission rate. When the channel condition is good or the first data block size is large, the first code unit length is adaptively adjusted to a larger code unit length based on the first data block size and/or the first coding mode is adaptively adjusted to a coding mode with higher reliability based on the first data block size, so as to further improve the reliability of data transmission. That is, when the communication device adaptively adjusts the first code unit length and/or the first coding mode based on the first data block size, the reliability of data transmission or data transmission rate is adaptively improved and the interference deletion processing at a receiving end is facilitated, thereby improving the data transmission performance and the integrity of data transmission.

Exemplarily, the terminal device can determine the first data block size according to parameters scheduled by the network device, and determine, based on the first mapping relationship, a code unit length corresponding to the first data block size group to which the first data block size belongs as the first code unit length, and/or determine, based on the first mapping relationship, a coding mode corresponding to the first data block size group as the first coding mode. Correspondingly, since the first data block size is determined by the terminal device according to the parameters scheduled by the network device, the understanding of the first data block size by the network device can be consistent with the understanding of the first data block size by the terminal device. Based on this, the network device can also determine, based on the first mapping relationship, the code unit length corresponding to the first data block size group to which the first data block size belongs as the first code unit length, and/or determine, based on the first mapping relationship, the coding mode corresponding to the first data block size group as the first coding mode.

Exemplarily, the first data block size may also be a scheduling-free parameter. For example, the first data block size may be pre-configured, i.e., the terminal device or the network device may determine, based on the first mapping relationship, the code unit length corresponding to the first data block size group to which the first data block size belongs as the first code unit length, and/or determine, based on the first mapping relationship, the coding mode corresponding to the first data block size group as the first coding mode.

Exemplarily, the parameters scheduled by the network device may be, for example, index information of a Modulation and Coding Scheme (MCS).

Exemplarily, the at least one data block size group includes at least one group obtained based on multiple bit number thresholds.

Exemplarily, the at least one data block size group includes k groups obtained based on k bit number thresholds, and each of the k groups corresponds to a respective coding mode and/or a respective code unit length. For example, assuming that $X_k$ represents the k-th threshold, a value range of the bit number corresponding to the first group among the k groups is $[1, X_1]$, a value range of the bit number corresponding to the second group among the k groups is $[X_1, X_2]$, and so on, and a value range of the bit number corresponding to the k-th group among the k groups is $[X_{k-1}, X_k]$.

Exemplarily, the at least one data block size group includes at least one group obtained by dividing at least one bit number.

Exemplarily, when the at least one bit number does not include the first data block size, a bit number closest to the first data block size is determined among the at least one bit number, and a group to which the bit number which is closest to the first data block size belongs is determined as the first data block size group. For example, a group to which a bit number being larger than the first data block size and closest to the first data block size belongs may be determined as the first data block size group. For another example, a group to which a bit number being smaller than the first data block size and closest to the first data block size belongs may be determined as the first data block size group. For example, assuming that the at least one bit number includes $X_1$, $X_2$, $X_3$, $X_4$ and $X_5$ in order from small to large, two groups are obtained by dividing $X_1$, $X_2$, $X_3$, $X_4$ and $X_5$, and the bit number in the first group among the two groups includes $X_1$, $X_2$ and $X_3$, and the bit number in the second group among the two groups includes $X_4$ and $X_5$. In this case, if the first data block size $X_t$ is a value between $X_3$ and $X_4$, the second group to which $X_4$ being larger than $X_t$ and closest to $X_t$ belongs may be determined as the first bit number group, or the first group to which $X_3$ being smaller than $X_t$ and closest to $X_t$ belongs may be determined as the first bit number group.

Of course, in other alternative embodiments, the at least one bit number may be another number of bit numbers, or 3 length groups or 4 data block size groups and the like may be obtained by dividing $X_1$, $X_2$, $X_3$, $X_4$ and $X_5$, which are not specifically limited in the present disclosure.

In some embodiments, different data block size groups correspond to different coding modes and/or different code unit lengths in the first mapping relationship, or multiple data block size groups correspond to a same coding mode and/or a same code unit length in the first mapping relationship.

Exemplarily, the data block size groups and the coding modes in the first mapping relationship may be in a one-to-one correspondence, in a one-to-multiple correspondence or in a multiple-to-one correspondence.

Exemplarily, the data block size groups and the code unit lengths in the first mapping relationship may be in a one-to-one correspondence, in a one-to-multiple correspondence or in a multiple-to-one correspondence.

In some embodiments, the first mapping relationship is determined by the communication device from multiple mapping relationships.

Exemplarily, the multiple mapping relationships may be pre-configured, configured by a network device or determined by a terminal device.

Exemplarily, the multiple mapping relationships may be determined by the terminal device, and further, the terminal device may send information indicating the multiple mapping relationships to the network device.

It should be noted that each of the multiple mapping relationships can be used to define a respective code unit length and/or a respective coding mode corresponding to each of the at least one data block size group, but the corresponding relationships between the data block size groups and the code unit lengths in different mapping relationships are different and/or the corresponding relationships between the data block size groups and the coding modes in different mapping relationships are different. Of course, in other alternative embodiments, the mapping relationship may also be referred to as a mapping pattern.

In some embodiments, the first mapping relationship is determined from the multiple mapping relationships based on related information of a terminal device, and/or the first mapping relationship is determined from the multiple mapping relationships based on information indicated by a network device.

Exemplarily, the first mapping relationship is determined from the multiple mapping relationships by a terminal device or a network device based on related information of the terminal device. Further, the terminal device can report the related information of the terminal device to the network device.

Exemplarily, the related information of the terminal device includes, but is not limited to, an identification of the terminal device and/or a cell identification of the terminal device.

Exemplarily, the first mapping relationship may be obtained by the communication device processing the related information of the terminal device according to a preset rule. For example, the first mapping relationship can be obtained by the communication device by calculating, according to a preset calculation method, the related information of the terminal device according to the preset rule. For example, the first mapping relationship may be obtained by the communication device performing modulo operation on the related information or a part of the related information of the terminal device based on the number of the multiple mapping relationships.

Exemplarily, the first mapping relationship is a mapping relationship indicated by a network device.

Figure 9:
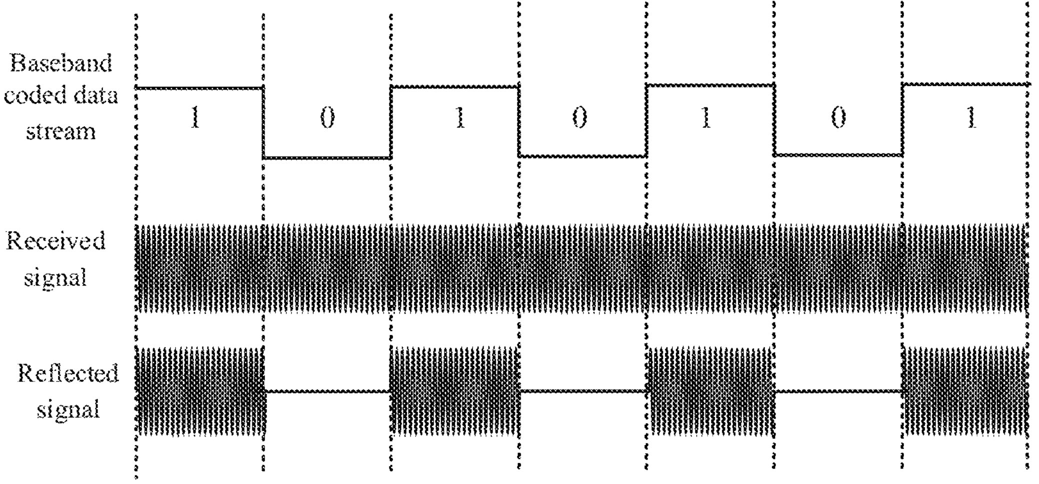
FIG. 9 and FIG. 10 are schematic diagrams of OOK modulation based on different coding modes according to embodiments of the present disclosure.
Figure 10:
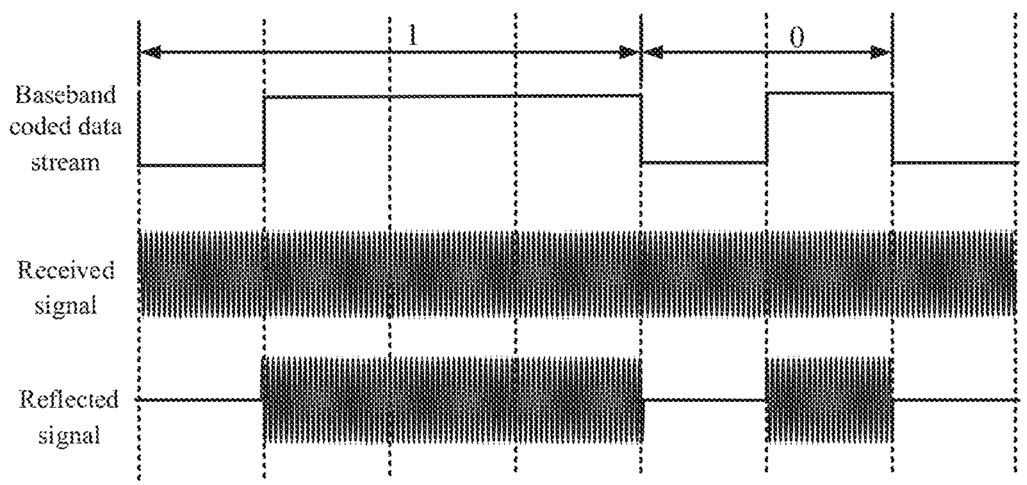

FIG. 9 and FIG. 10 are schematic diagrams of OOK modulation based on different coding modes according to the embodiments of the present disclosure.

Exemplarily, a coding mode 1 illustrated in FIG. 9 is a coding mode determined by the communication device based on $L_1$, and a coding mode 2 illustrated in FIG. 10 is a coding mode determined by the communication device based on $L_2$.

In other words, when the first data block size is $L_1$, the communication device can adaptively adjust the first coding mode to the coding mode 1 based on the first data block size; and when the first data block size is $L_2$, the communication device can adaptively adjust the first coding mode to the coding mode 2 based on the first data block size. That is, the communication device can adaptively adjust the first coding mode based on the first data block size. Further, in the examples illustrated in FIG. 9 and FIG. 10, when the same code unit length is used, since the coding mode 1 has a higher transmission rate, if $L_1>L_2$, it is equivalent that the first coding mode may be adjusted adaptively to a coding mode having a higher transmission rate based on the first data block size when the first data block size is large; and the first coding mode may be adjusted adaptively to a coding mode with higher reliability based on the first data block size when the first data block size is small. In this way, the reliability of data transmission or data transmission rate is adaptively improved and the interference deletion processing at a receiving end is facilitated, thereby facilitating improving the data transmission performance and the integrity of data transmission.

It should be understood that FIG. 9 and FIG. 10 are only examples of the present disclosure and should not be construed as limitation of the present disclosure.

For example, in other alternative embodiments, when the first data block size is fixed, different mapping relationships may be used, and different coding modes may be determined based on the first data block size, which is not specifically limited in the present disclosure.

Figure 11:
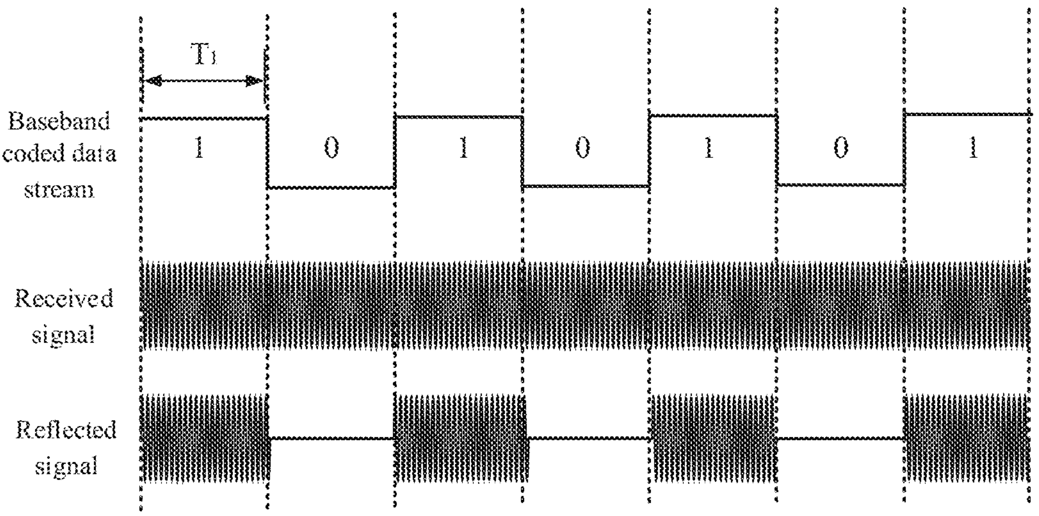
FIG. 11 and FIG. 12 are schematic diagrams of OOK modulation based on different code unit lengths according to embodiments of the present disclosure.
Figure 12:
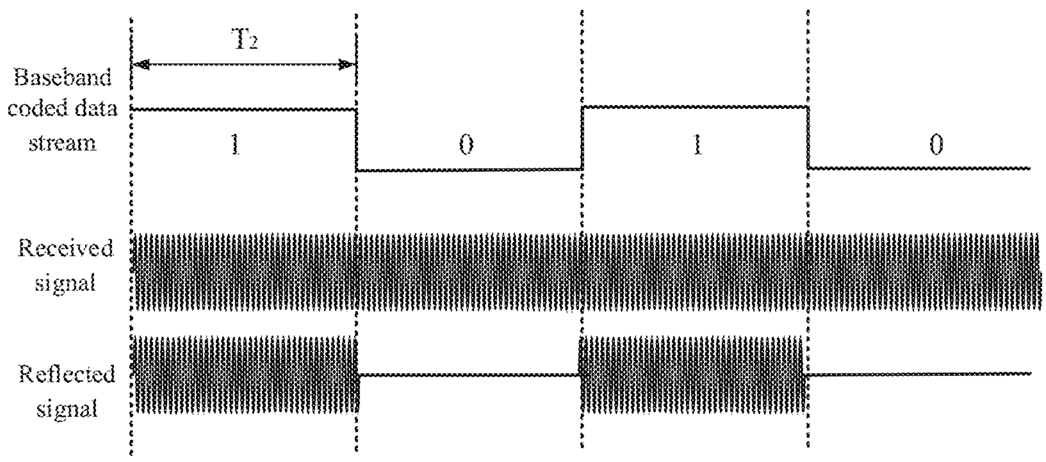

FIG. 11 and FIG. 12 are schematic diagrams of OOK modulation based on different code unit lengths according to embodiments of the present disclosure.

Exemplarily, a code unit length illustrated in FIG. 11 is $T_1$ and a code unit length illustrated in FIG. 12 is $T_2$.

In other words, when the first data block size is $L_1$, the communication device can adaptively adjust the first code unit length to $T_1$ based on the first data block size; and when the first data block size is $L_2$, the communication device can adaptively adjust the first code unit length to $T_2$ based on the first data block size. Furthermore, in the examples illustrated in FIG. 11 and FIG. 12, when the same coding mode is used, since $T_1$ has a higher transmission rate, if $L_1>L_2$, it is equivalent that the first code unit length can be adaptively adjusted to a smaller code unit length based on the first data block size when the first data block size is large, which facilitates improvement of the data transmission rate; and the first code unit length can be adaptively adjusted to a larger code unit length based on the first data block size when the first data block size is large, which facilitates improvement of the reliability of data transmission. In this way, the reliability of data transmission or data transmission rate is adaptively improved and the interference deletion processing at a receiving end is facilitated, thereby improving the data transmission performance and the integrity of the data transmission.

It should be understood that FIG. 11 and FIG. 12 are only examples of the present disclosure and should not be construed as limiting the present disclosure.

For example, in other alternative embodiments, when the first data block size is fixed, different mapping relationships may be used, and different code unit lengths may be determined based on the first data block size, which is not specifically limited in the present disclosure.

In some embodiments, the S210 may include the following operation.

When the first information includes the first code rate, a first code rate group to which the first code rate belongs is determined.

A code unit length corresponding to the first code rate group is determined as the first code unit length based on a second mapping relationship, and/or a coding mode corresponding to the first code rate group is determined as the first coding mode based on the second mapping relationship. The second mapping relation includes a corresponding relationship between each of at least one code rate group and a respective code unit length and/or a respective coding mode, and the at least one code rate group includes the first code rate group.

In the embodiment, when the first information includes the first code rate, it is equivalent that the first code unit length and/or the first coding mode are associated with the first code rate. That is, the communication device can adaptively adjust the first code unit length and/or the first coding mode based on the first code rate, and then adaptively improve the reliability of data transmission or data transmission rate based on the first code rate, which facilitates improvement of the data transmission performance.

For example, when a channel condition is poor or the first code rate is small, the first code unit length is adaptively adjusted to a larger code unit length based on the first code rate, and/or the first coding mode is adaptively adjusted to a coding mode with higher reliability based on the first code rate, so as to improve the reliability of data transmission. When the channel condition is good or the first data block size is large, the first code unit length is adaptively adjusted to a smaller code unit length based on the first code rate, and/or the first coding mode is adaptively adjusted to a coding mode with a higher transmission rate based on the first code rate, so as to improve the data transmission rate. That is, when the communication device adaptively adjusts, the first code unit length and/or the first coding mode based on the first code rate, the reliability of data transmission or data transmission rate is adaptively improved and the interference deletion processing at a receiving end is facilitated, thereby improving the data transmission performance and the integrity of data transmission.

For another example, when a channel condition is r poor or the first code rate is small, the first code unit length is adaptively adjusted to a larger code unit length based on the first code rate, and/or the first coding mode is adaptively adjusted to a coding mode with a higher transmission rate based on the first code rate, so as to further improve the data transmission rate. When the channel condition is good or the first data block size is large, the first code unit length is adaptively adjusted to a larger code unit length based on the first code rate, and/or the first coding mode is adaptively adjusted to a coding mode with higher reliability based on the first code rate, so as to further improve the reliability of data transmission. That is, when the communication device adaptively adjusts the first code unit length and/or the first coding mode based on the first code rate, the reliability of data transmission or data transmission rate is adaptively improved and the interference deletion processing at a receiving end is facilitated, thereby improving the data transmission performance and the integrity of data transmission.

Exemplarily, the terminal device can determine the first code rate according to parameters scheduled by the network device, and determine, based on the second mapping relationship, a code unit length corresponding to the first code rate group to which the first code rate belongs as the first code unit length, and/or determine, based on the second mapping relationship, a coding mode corresponding to the first code rate group as the first coding mode. Correspondingly, since the first code rate is determined by the terminal device according to the parameters scheduled by the network device, the understanding of the first code rate by the network device can be consistent with the understanding of the first code rate by the terminal device. Based on this, the network device can also determine, based on the second mapping relationship, the code unit length corresponding to the first code rate group to which the first code rate belongs as the first code unit length, and/or determine, based on the second mapping relationship, the coding mode corresponding to the first code rate group as the first coding mode.

Exemplarily, the first code rate may also be a scheduling-free parameter. For example, the first code rate may be pre-configured, i.e., the terminal device or the network device may determine, based on the second mapping relationship, the code unit length corresponding to the first code rate group to which the first code rate belongs as the first code unit length, and/or determine, based on the second mapping relationship, the coding mode corresponding to the first code rate as the first coding mode.

Exemplarily, the parameters scheduled by the network device may be, for example, index information of an MCS.

Exemplarily, the at least one code rate group includes at least one group obtained based on multiple code rate thresholds.

Exemplarily, the at least one rate group includes r groups obtained based on r code rate thresholds, and each of the r groups corresponds to a respective coding mode and/or a respective code unit length. For example, assuming that $R_r$ represents the r-th threshold, a value range of the code rate corresponding to the first group among the r groups is $[1, R_1]$, a value range of the code rate corresponding to the second group among the r groups is $[R_1, R_2]$, and so on, and a value range of the code rate corresponding to the r-th group among the r groups is $[R_{r-1}, R_r]$.

Exemplarily, the at least one code rate group includes at least one group obtained by dividing at least one code rate.

Exemplarily, when the at least one code rate does not include the first code rate, a code rate closest to the first code rate is determined among the at least one code rate, and a group to which the code rate closest to the first code rate belongs is determined as the first code rate group. For example, a group to which a code rate being greater than the first code rate and closest to the first code rate belongs may be determined as the first code rate group. For another example, a group to which a code rate being smaller than the first code rate and closest to the first code rate belongs may be determined as the first code rate group. For example, assuming that the at least one code rate includes $R_1$, $R_2$, $R_3$, $R_4$ and $R_5$ in order from small to large, two groups are obtained by dividing $R_1$, $R_2$, $R_3$, $R_4$ and $R_5$. The code rate in the first group among the two groups includes $R_1$, $R_2$, and $R_3$, and the code rate in the second group among the two groups include $R_4$ and $R_5$. In this case, if the first code rate $R_t$ is a value between $R_3$ and $R_4$, the second group to which $R_4$ being greater than $R_t$ and closest to $R_t$ belongs can be determined as the first code rate group, or the first group to which $R_3$ being smaller than $R_t$ and closest to $R_t$ belongs may be determined as the first code rate group.

Of course, in other alternative embodiments, the at least one code rate may be another number of code rates, or 3 length groups or 4 code rate groups and the like may be obtained by dividing $R_1$, $R_2$, $R_3$, $R_4$ and $R_5$, which are not specifically limited in the present disclosure.

In some embodiments, different code rate groups correspond to different coding modes and/or different code unit lengths in the second mapping relationship, or multiple code rate groups correspond to a same coding mode and/or a same code unit length in the second mapping relationship.

Exemplarily, the rate groups and the coding modes in the second mapping relationship may be in a one-to-one correspondence, in a one-to-multiple correspondence or in a multiple-to-one correspondence.

Exemplarily, the rate groups and the code unit lengths in the second mapping relationship may be in a one-to-one correspondence, in a one-to-multiple correspondence or in a multiple-to-one correspondence.

In some embodiments, the second mapping relationship is determined from multiple mapping relationships by the communication device.

Exemplarily, the multiple mapping relationships may be pre-configured, configured by a network device or determined by a terminal device.

Exemplarily, the multiple mapping relationships may be determined by the terminal device, and further, the terminal device may send information indicating the multiple mapping relationships to the network device.

It should be noted that each of the multiple mapping relationships can be used to define a respective code unit length and/or a respective coding mode corresponding to each of the at least one code rate group, but the corresponding relationships between the code rate groups and the code unit lengths in different mapping relationships are different and/or the corresponding relationships between the code rate groups and the coding modes in different mapping relationships are different. Of course, in other alternative embodiments, the mapping relationship may also be referred to as a mapping pattern.

In some embodiments, the second mapping relationship is determined from the multiple mapping relationships based on related information of a terminal device, and/or the second mapping relationship is determined from the multiple mapping relationships based on information indicated by a network device.

Exemplarily, the second mapping relationship is determined from the multiple mapping relationships by the terminal device or the network device based on related information of the terminal device. Further, the terminal device can report the related information of the terminal device to the network device.

Exemplarily, the related information of the terminal device includes, but is not limited to, an identification of the terminal device and/or a cell identification of the terminal device.

Exemplarily, the second mapping relationship may be obtained by the communication device processing the related information of the terminal device according to a preset rule. For example, the second mapping relationship can be obtained by the communication device by calculating, according to a preset calculation method, the related information of the terminal device according to the preset rule. For example, the second mapping relationship may be obtained by the communication device performing modulo operation on the related information or a part of the related information of the terminal device based on the number of the multiple mapping relationships.

Exemplarily, the second mapping relationship is a mapping relationship indicated by a network device.

With reference to FIG. 9 and FIG. 10, when the first code rate is $R_1$, the communication device can adaptively adjust the first coding mode to the coding mode 1 based on the first code rate; and when the first code rate is $R_2$, the communication device can adaptively adjust the first coding mode to the coding mode 2 based on the first code rate. That is, the communication device can adaptively adjust the first coding mode based on the first code rate. Further, in the examples illustrated in FIG. 9 and FIG. 10, when the same code unit length is used, since the coding mode 1 has a higher transmission rate, if $R_1>R_2$, it is equivalent that the communication device can adaptively adjust the first coding mode to a coding mode having a higher transmission rate based on the first code rate when the first code rate is relatively large; and the communication device can adaptively adjust the first coding mode to a coding mode with higher reliability based on the first code rate when the first code rate is relatively small. In this way, the reliability of data transmission or data transmission rate is adaptively improved and the interference deletion processing at a receiving end is facilitated, thereby improving the data transmission performance and the integrity of data transmission.

With reference to FIG. 11 and FIG. 12, when the first code rate is $R_1$, the communication device can adaptively adjust the first code unit length to $T_1$ based on the first code rate; and when the first code rate is $R_2$, the communication device can adaptively adjust the first code unit length to $T_2$ based on the first code rate. Furthermore, in the examples illustrated in FIG. 11 and FIG. 12, when the same coding mode is used, since $T_1$ has a higher transmission rate, if $R_1>R_2$, it is equivalent that the communication device can adaptively adjust the first code unit length to a smaller code unit length based on the first code rate when the first code rate is large, which facilitates improvement of the data transmission rate; and the communication device can adaptively adjust the first code unit length to a larger code unit length based on the first code rate when the first code rate is relatively large, which facilitates improvement of the reliability of data transmission. In this way, the reliability of data transmission or data transmission rate is adaptively improved and the interference deletion processing at a receiving end is facilitated, thereby improving the data transmission performance and the integrity of data transmission.

In some embodiments, the S210 may include the following operations.

When the first information includes the first data block size and the first code rate, a first group to which the first data block size and the first code rate belong is determined.

A code unit length corresponding to the first group is determined as the first code unit length based on a third mapping relationship, and/or a coding mode corresponding to the first group is determined as the first coding mode based on the third mapping relationship. The third mapping relationship includes a corresponding relationship between each of at least one group and a respective code unit length and/or a respective coding mode, and the at least one group includes the first group.

In the embodiment, when the first information includes the first data block size and the first code rate, it is equivalent that the first code unit length is associated with the first data block size and the first code rate, and/or the first coding mode is associated with the first data block size and the first code rate. That is, the communication device can adaptively adjust the first code unit length and/or the first coding mode based on the first data block size and the first code rate, and then adaptively improve the reliability of data transmission or data transmission rate based on the first data block size and the first code rate, which facilitates improvement of the data transmission performance.

For example, when a channel condition is poor, the first data block size is small or the first code rate is small, the first code unit length is adaptively adjusted to a larger code unit length based on the first data block size, and/or the first coding mode is adaptively adjusted to a coding mode with higher reliability based on the first data block size, so as to improve the reliability of data transmission. When the channel condition is good, the first data block size is large or the first code rate is large, the first code unit length is adaptively adjusted to a smaller code unit length based on the first data block size and/or the first coding mode is adaptively adjusted to a coding mode with a higher transmission rate based on the first data block size, so as to improve the data transmission rate. That is, when the communication device adaptively adjusts the first code unit length and/or the first coding mode based on the first data block size, the reliability of data transmission or data transmission rate is adaptively improved and the interference deletion processing at a receiving end is facilitated, thereby improving the data transmission performance and the integrity of data transmission.

For another example, when a channel condition is poor, the first data block size is small or the first code rate is small, the first code unit length is adaptively adjusted to a larger code unit length based on the first data block size, and/or the first coding mode is adaptively adjusted to a coding mode with a higher transmission rate based on the first data block size, so as to further improve the data transmission rate. When the channel condition is good, the first data block size is large or the first code rate is large, the first code unit length is adaptively adjusted to a larger code unit length based on the first data block size, and/or the first coding mode is adaptively adjusted to a coding mode with higher reliability based on the first data block size, so as to further improve the reliability of data transmission. That is, when the communication device adaptively adjusts the first code unit length and/or the first coding mode based on the first data block size, the reliability of data transmission or data transmission rate is adaptively improved and the interference deletion processing at a receiving end is facilitated, thereby improving the data transmission performance and the integrity of data transmission.

Exemplarily, the terminal device can determine the first data block size and/or the first code rate according to parameters scheduled by the network device, and determine, based on the third mapping relationship, a code unit length corresponding to the first group to which the first data block size and the first code rate belong as the first code unit length, and/or determine, based on the third mapping relationship, a coding mode corresponding to the first group as the first coding mode. Correspondingly, since the first data block size and the first code rate are determined by the terminal device according to the parameters scheduled by the network device, the understanding of the first data block size and the first code rate by the network device can be consistent with the understanding of the first data block size and the first code rate by the terminal device. Based on this, the network device can also determine, based on the third mapping relationship, the code unit length corresponding to the first group to which the first data block size and the first code rate belong as the first code unit length, and/or determine, based on the third mapping relationship, the coding mode corresponding to the first group as the first coding mode.

Exemplarily, the first transport block size and the first code rate may also be scheduling-free parameters. For example, the first transport block size and the first code rate may be pre-configured, i.e., the terminal device or the network device may determine, based on the third mapping relationship, the code unit length corresponding to the first group to which the first data block size and the first code rate belong as the first code unit length and/or determine, based on the third mapping relationship, the coding mode corresponding to the first group as the first coding mode.

Exemplarily, the parameters of the network device scheduling may be, for example, index information of an MCS.

In some embodiments, the first group is determined based on the first data block size group to which the first data block size belongs and the first code rate group to which the first code rate belongs.

It should be understood that the relevant contents of the first data block size group and the first code rate group can be referred to above and will not be repeated herein to avoid repetition.

In some embodiments, the first group is an intersection of a first data block size group to which the first data block size belongs and a first code rate group to which the first code rate belongs, or the first group is a union of the first data block size group to which the first data block size belongs and the first code rate group to which the first code rate belongs.

Exemplarily, when the first group is located in an intermediate position of the at least one group, the first group is the intersection of the first data block size group to which the first data block size belongs and the first code rate group to which the first code rate belongs.

Exemplarily, when the first group is not located in an intermediate position of the at least one group, the first group is the union of the first data block size group to which the first data block size belongs and the first code rate group to which the first code rate belongs.

In some embodiments, the at least one group includes 3 groups. A data block size(s) in a first group among the three groups is less than $X_1$, or a code rate(s) in the first group is less than $R_1$, $X_1>0$, $R_1>0$; a data block size(s) in a second group among the three groups is greater than or equal to $X_1$ and less than $X_2$, and a code rate(s) in the second group is greater than or equal to $R_1$ and less than $R_2$, $X_2>X_1$, $R_2>R_1$; a data block size(s) in a third group among the three groups is greater than or equal to $X_2$, or a code rate(s) in the third group is greater than or equal to $R_2$.

The third mapping relationship is described below in connection with the three groups.

Figure 13:
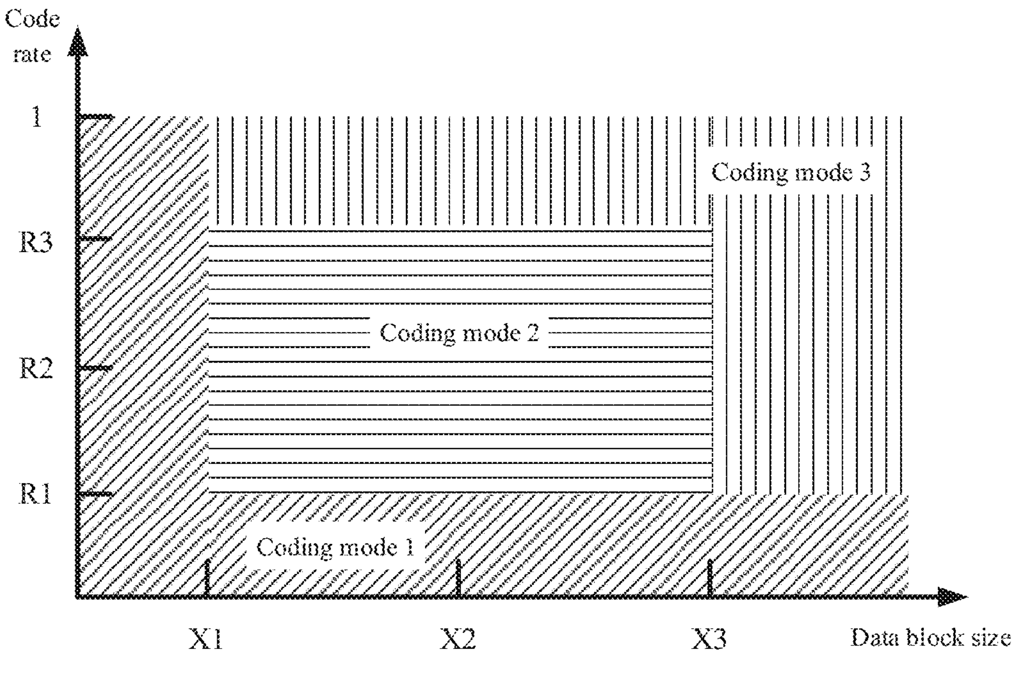
FIG. 13 to FIG. 15 are schematic diagrams of the third mapping relationship according to embodiments of the present disclosure.
Figure 14:
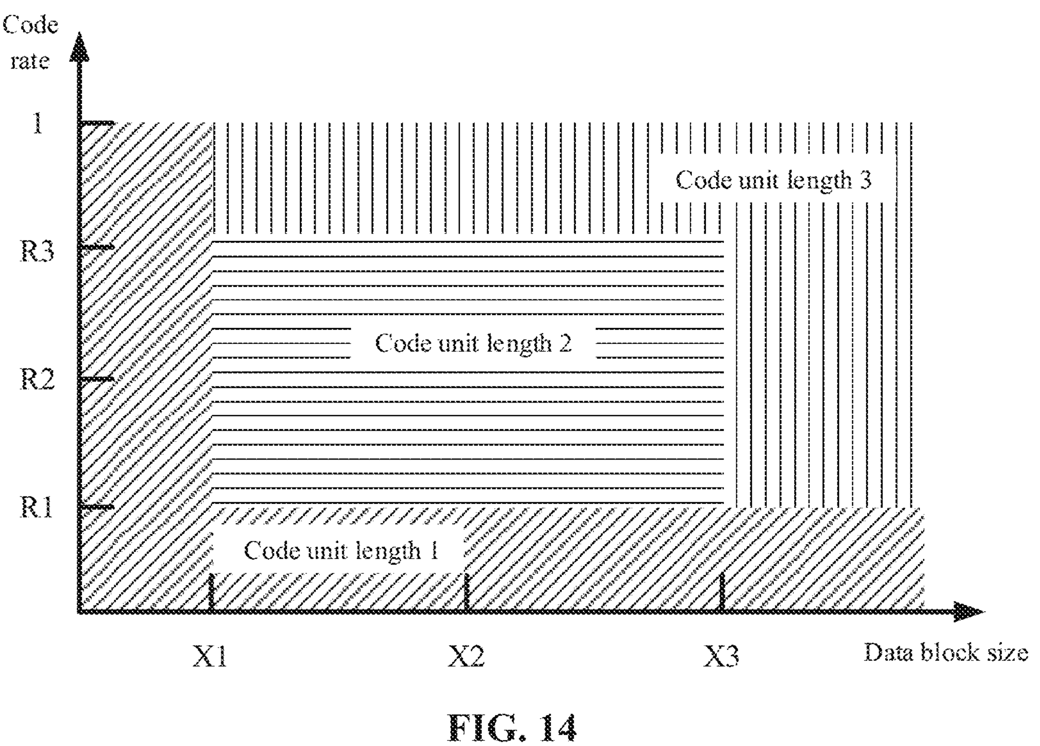
Figure 15:
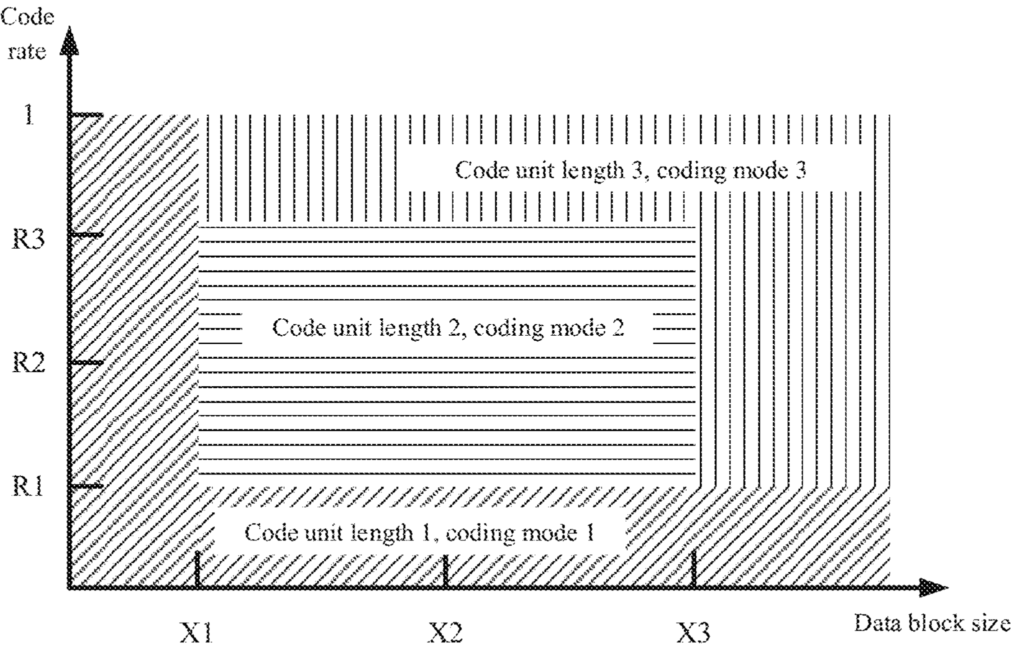

FIG. 13 to FIG. 15 are schematic diagrams of the third mapping relationship according to embodiments of the present disclosure.

As illustrated in FIG. 13, the first group corresponds to a coding mode 1, the second group corresponds to a coding mode 2, and the third group corresponds to a coding mode 3. As illustrated in FIG. 14, the first group corresponds to a code unit length 1, the second group corresponds to a code unit length 2, and the third group corresponds to a code unit length 3. As illustrated in FIG. 15, the first group corresponds to the coding mode 1 and the code unit length 1, the second group corresponds to the coding mode 2 and the code unit length 2, and the third group corresponds to the coding mode 3 and the code unit length 3.

In this embodiment, the coding mode 1, the coding mode 2, and the coding mode 3 may be completely different coding modes, or there may be the same coding mode among the coding mode 1, the coding mode 2, and the coding mode 3. Exemplarily, the code unit length 1, the code unit length 2, and the code unit length 3 may be completely different code unit lengths, or there may be the same code unit length among the code unit length 1, the code unit length 2, and the code unit length 3. In addition, both the code unit lengths and coding modes may be different in different groups, or only the code unit lengths or the coding modes may be the same.

In some embodiments, different groups correspond to different coding modes and/or different code unit lengths in the third mapping relationship, or different groups correspond to a same coding mode and/or a same code unit length in the third mapping relationship.

Exemplarily, the groups and the coding modes in the third mapping relationship may be in a one-to-one correspondence, in a one-to-multiple correspondence or in a multiple-to-one correspondence.

Exemplarily, the groups and the code unit lengths in the third mapping relationship may be in a one-to-one correspondence, in a one-to-multiple correspondence or in a multiple-to-one correspondence.

In some embodiments, the third mapping relationship is determined from multiple mapping relationships by the communication device.

Exemplarily, the multiple mapping relationships may be pre-configured, configured by a network device or determined by a terminal device.

Exemplarily, the multiple mapping relationships may be determined by the terminal device, and further, the terminal device may send information indicating the multiple mapping relationships to the network device.

It should be noted that each of the multiple mapping relationships can be used to define a respective code unit length and/or a respective coding mode corresponding to each of the at least one group, but the corresponding relationships between the groups and the code unit lengths in different mapping relationships are different and/or the corresponding relationships between the groups and the coding modes in different mapping relationships are different. Of course, in other alternative embodiments, the mapping relationship may also be referred to as a mapping pattern.

In some embodiments, the third mapping relationship is determined from the multiple mapping relationships based on related information of a terminal device, and/or the third mapping relationship is determined in the multiple mapping relationships based on information indicated by a network device.

Exemplarily, the third mapping relationship is determined from the multiple mapping relationships by a terminal device or a network device based on related information of the terminal device. Further, the terminal device can report the related information of the terminal device to the network device.

Exemplarily, the related information of the terminal device includes, but is not limited to, an identification of the terminal device and/or a cell identification of the terminal device.

Exemplarily, the third mapping relationship may be obtained by the communication device processing the related information of the terminal device according to a preset rule. For example, the third mapping relationship can be obtained by the communication device by calculating, according to a preset calculation method, the related information of the terminal device according to the preset rule. For example, the third mapping relationship may be obtained by the communication device performing modulo operation on the related information or a part of the related information of the terminal device based on the number of the multiple mapping relationships.

Exemplarily, the third mapping relationship is a mapping relationship indicated by a network device.

With reference to FIG. 9 and FIG. 10, when the first data block size is $L_1$ and the first code rate is $R_1$, the communication device can adaptively adjust the first coding mode to the coding mode 1 based on the first group to which the first data block size and the first code rate belong. When the first data block size is $L_2$ and the first code rate is $R_2$, the communication device can adaptively adjust the first coding mode to the coding mode 2 based on the first group to which the first data block size and the first code rate belong. That is, the communication device can adaptively adjust the first coding mode based on the first data block size and the first code rate. Further, in the examples illustrated in FIG. 9 and FIG. 10, when the same code unit length is used, since the coding mode 1 has a higher transmission rate, if $L_1>L_2$ or $R_1>R_2$, it is equivalent that the communication device can adaptively adjust the first coding mode to a coding mode with a higher transmission rate based on the first data block size and the first code rate when the first data block size is large or the first code rate is large; and the communication device can adaptively adjust the first coding mode to a coding mode with higher reliability based on the first data block size and the first code rate when the first data block size is small or the first code rate is small. In this way, the reliability of data transmission or data transmission rate is adaptively improved and the interference deletion processing at a receiving end is facilitated, thereby improving the data transmission performance and the integrity of data transmission.

With reference to FIG. 11 and FIG. 12, when the first data block size is $L_1$ and the first code rate is $R_1$, the communication device can adaptively adjust the first code unit length to $T_1$ based on the first group to which the first data block size and the first code rate belong. When the first data block size is $L_2$ and the first code rate is $R_2$, the communication device can adaptively adjust the first code unit length to $T_2$ based on the first group to which the first data block size and the first code rate belong. That is, the communication device can adaptively adjust the first code unit length based on the first data block size and the first code rate. Further, in the examples illustrated in FIG. 11 and FIG. 12, when the same coding mode is used, since $T_1$ has a higher transmission rate, if $L_1>L_2$ or $R_1>R_2$, it is equivalent that the communication device can adaptively adjust the first code unit length to a code unit length with a higher transmission rate based on the first data block size and the first code rate when the first data block size is large or the first code rate is large; and the communication device can adaptively adjust the first code unit length to a code unit length with higher reliability based on the first data block size and the first code rate when the first data block size is small or the first code rate is small. In this way, the reliability of data transmission or data transmission rate is adaptively improved and the interference deletion processing at a receiving end is facilitated, thereby improving the data transmission performance and the integrity of data transmission.

In some embodiments, the S210 may include the following operations.

When the first information includes the first bit number, a first bit number group to which the first bit number belongs is determined.

A code unit length corresponding to the first bit number group is determined as the first code unit length based on a fourth mapping relationship, and/or a coding mode corresponding to the first bit number group is determined as the first coding mode based on the fourth mapping relationship. The fourth mapping relationship includes a corresponding relationship between each of at least one bit number group and a respective code unit length and/or a respective coding mode, and the at least one bit number group includes the first bit number group.

In the embodiment, when the first information includes the first bit number, it is equivalent that the first code unit length and/or the first coding mode are associated with the first bit number. That is, the communication device can adaptively adjust the first code unit length and/or the first coding mode based on the first bit number, and then adaptively improve the reliability of data transmission or data transmission rate based on the first bit number, which facilitates improvement of the data transmission performance.

For example, when a channel condition is poor or the first bit number is small, the first code unit length is adaptively adjusted to a larger code unit length based on the first bit number, and/or the first coding mode is adaptively adjusted to a coding mode with higher reliability based on the first bit number, so as to improve the reliability of data transmission. When the channel condition is good or the first data block size is large, the first code unit length is adaptively adjusted to a smaller code unit length based on the first bit number, and/or the first coding mode is adaptively adjusted to a coding mode with a higher transmission rate based on the first bit number, so as to improve the data transmission rate. That is, when the communication device adaptively adjusts the first code unit length and/or the first coding mode based on the first bit number, the reliability of data transmission or data transmission rate is adaptively improved and the interference deletion processing at a receiving end is facilitated, thereby improving the data transmission performance and the integrity of data transmission.

For another example, when a channel condition is poor or the first bit number is small, the first code unit length is adaptively adjusted to a larger code unit length based on the first bit number, and/or the first coding mode is adaptively adjusted to a coding mode with a higher transmission rate based on the first bit number, so as to further improve the data transmission rate. When the channel condition is good or the first data block size is large, the first code unit length is adaptively adjusted to a larger code unit length based on the first bit number, and/or the first coding mode is adaptively adjusted to a coding mode with higher reliability based on the first bit number, so as to further improve the reliability of data transmission. That is, when the communication device adaptively adjusts the first code unit length and/or the first coding mode based on the first bit number, the reliability of data transmission or data transmission rate is adaptively improved and the interference deletion processing at a receiving end is facilitated, thereby improving the data transmission performance and the integrity of data transmission.

Exemplarily, the terminal device can determine the first bit number according to parameters scheduled by the network device, and determine, based on the fourth mapping relationship, a code unit length corresponding to the first bit number group to which the first bit number belongs as the first code unit length, and/or determine, based on the fourth mapping relationship, a coding mode corresponding to the first bit number group as the first coding mode. Correspondingly, since the first bit number is determined by the terminal device according to the parameters scheduled by the network device, the understanding of the first bit number by the network device can be consistent with the understanding of the first bit number by the terminal device. Based on this, the network device can also determine, based on the fourth mapping relationship, the code unit length corresponding to the first bit number group to which the first bit number belongs as the first code unit length, and/or determine, based on the fourth mapping relationship, the coding mode corresponding to the first bit number group as the first coding mode.

Exemplarily, the first bit number may also be a scheduling-free parameter. For example, the first bit number may be pre-configured, i.e., the terminal device or the network device may determine, based on the fourth mapping relationship, the code unit length corresponding to the first bit number group to which the first bit number belongs as the first code unit length, and/or determine, based on the fourth mapping relationship, the coding mode corresponding to the first bit number group as the first coding mode.

Exemplarily, the parameters scheduled by the network device may be, for example, index information of an MCS.

Exemplarily, the at least one bit number group includes b groups obtained based on b bit number thresholds, and each of the b groups corresponds to a respective coding mode and/or a respective code unit length. For example, assuming that $B_b$ represents the b-th threshold, a value range of the bit number corresponding to the first group among the b groups is $[1, B_1]$, a value range of the bit number corresponding to the second group among the b groups is $[B_1, B_2]$, and so on, a value range of the bit number corresponding to the b-th group among the b groups is $[B_{b-1}, B_b]$.

Exemplarily, the at least one bit number group includes at least one group obtained by dividing at least one bit number.

Exemplarily, when the at least one bit number does not include the first bit number, a bit number closest to the first bit number is determined among the at least one bit number, and a group to which the bit number closest to the first bit number belongs is determined as the first bit number group. For example, a group to which a bit number being greater than the first bit number and closest to the first bit number belongs may be determined as the first bit number group. For another example, a group to which a bit number being smaller than and closest to the first bit number belongs may be determined as the first bit number group. For example, assuming that the at least one bit number includes $B_1$, $B_2$, $B_3$, $B_4$ and $B_5$ in order from small to large, two groups are obtained by dividing $B_1$, $B_2$, $B_3$, $B_4$ and $B_5$, the bit number in the first group among the two groups includes $B_1$, $B_2$ and $B_3$, and the bit number in the second group among the two groups includes $B_4$ and $B_5$. In this case, if the first data block size $B_t$ is a value between $B_3$ and $B_4$, the second group to which $B_4$ being larger than $B_t$ and closest to $B_t$ belongs may be determined as the first bit number group, or the first group to which $B_3$ being smaller than $B_t$ and closest to $B_t$ belongs may be determined as the first bit number group.

Of course, in other alternative embodiments, the at least one bit number may be another number of bit numbers, or 3 length groups or 4 bit number groups and the like may be obtained by dividing $B_1$, $B_2$, $B_3$, $B_4$ and $B_5$, which are not specifically limited in the present disclosure.

In some embodiments, different bit number groups correspond to different coding modes and/or different code unit lengths in the fourth mapping relationship, or multiple bit number groups correspond to a same coding mode and/or a same code unit length in the fourth mapping relationship.

Exemplarily, the bit number groups and coding modes in the fourth mapping relationship may be in a one-to-one correspondence, in a one-to-multiple correspondence or in a multiple-to-one correspondence.

Exemplarily, the bit number groups and the code unit lengths in the fourth mapping relationship may be in a one-to-one correspondence, in a one-to-multiple correspondence or in a multiple-to-one correspondence.

In some embodiments, the fourth mapping relationship is determined from multiple mapping relationships by the communication device.

Exemplarily, the multiple mapping relationships may be pre-configured, configured by a network device or determined by a terminal device.

Exemplarily, the multiple mapping relationships may be determined by the terminal device, and further, the terminal device may send information indicating the multiple mapping relationships to the network device.

It should be noted that each of the multiple mapping relationships can be used to define a respective code unit length and/or a respective coding mode corresponding to each of the at least one bit number group, but the corresponding relationship between the bit number group and the code unit length in different mapping relationships is different and/or the corresponding relationship between the bit number group and the coding mode in different mapping relationships is different. Of course, in other alternative embodiments, the mapping relationship may also be referred to as a mapping pattern.

In some embodiments, the fourth mapping relationship is determined from the multiple mapping relationships based on related information of a terminal device, and/or the fourth mapping relationship is determined in the multiple mapping relationships based on information indicated by a network device.

Exemplarily, the fourth mapping relationship is determined from the multiple mapping relationships by a terminal device or a network device based on related information of the terminal device. Further, the terminal device can report the related information of the terminal device to the network device.

Exemplarily, the related information of the terminal device includes, but is not limited to, an identification of the terminal device and/or a cell identification of the terminal device.

Exemplarily, the fourth mapping relationship may be obtained by the communication device processing the related information of the terminal device according to a preset rule. For example, the fourth mapping relationship can be obtained by the communication device by calculating, according to a preset calculation method, the related information of the terminal device according to the preset rule. For example, the fourth mapping relationship may be obtained by the communication device performing modulo operation on the related information or a part of the related information of the terminal device based on the number of the multiple mapping relationships.

Exemplarily, the fourth mapping relationship is a mapping relationship indicated by a network device.

With reference to FIG. 9 and FIG. 10, when the first bit number is $B_1$, the communication device can adaptively adjust the first coding mode to the coding mode 1 based on the first bit number; and when the first bit number is $B_2$, the communication device can adaptively adjust the first coding mode to the coding mode 2 based on the first bit number. That is, the communication device can adaptively adjust the first coding mode based on the first bit number. Further, in the examples illustrated in FIG. 9 and FIG. 10, when the same code unit length is used, since the coding mode 1 has a higher transmission rate, if $B_1>B_2$, it is equivalent that the communication device can adaptively adjust the first coding mode to a coding mode with a higher transmission rate based on the first bit number when the first bit number is large; and the communication device can adaptively adjust the first coding mode to a coding mode with higher reliability based on the first bit number when the first bit number is small. Therefore, the reliability of data transmission or data transmission rate is adaptively improved and the interference deletion processing at a receiving end is facilitated, thereby improving the data transmission performance and the integrity of data transmission.

With reference to FIG. 11 and FIG. 12, when the first bit number is $B_1$, the communication device can adaptively adjust the first code unit length to $T_1$ based on the first bit number; and when the first bit number is $B_2$, the communication device can adaptively adjust the first code unit length to $T_2$ based on the first bit number. Furthermore, in the examples illustrated in FIG. 11 and FIG. 12, when the same coding mode is used, since $T_1$ has a higher transmission rate, if $B_1>B_2$, it is equivalent that the communication device can adaptively adjust the first code unit length to a smaller code unit length based on the first bit number when the first bit number is large, which facilitates improvement of the data transmission rate; and the communication device can adaptively adjust the first code unit length to a larger code unit length based on the first bit number when the first bit number is large, which facilitates improvement of the reliability of data transmission. Therefore, the reliability of data transmission or data transmission rate is adaptively improved and the interference deletion processing at a receiving end is facilitated, thereby improving the data transmission performance and the integrity of data transmission.

In some embodiments, the communication device is a terminal device, and the method 200 may further include the following operations.

The first data is encoded by using the first code unit length and/or the first coding mode to obtain the first data stream.

The first data stream is sent to a network device.

Exemplarily, taking the first code unit length as an example, after the terminal device determines the first code unit length based on the first information, the terminal device encodes the first data by using the first code unit length to obtain the first data stream; and then sends the first data stream to the network device.

In some embodiments, the method 200 may further include the following operation.

Scheduling information sent by the network device is received. The scheduling information is used for indicating the first data block size and/or the first code rate.

Exemplarily, before determining the first code unit length and/or the first coding mode, the terminal device receives the scheduling information sent by the network device.

In some embodiments, the communication device is a network device, and the method 200 may further include the following operations.

The first data stream sent by the terminal device is received.

The first data stream is decoded by using the first code unit length and/or the first coding mode to obtain the first data.

Exemplarily, after receiving the first data stream sent by the terminal device, the network device determines the first code unit length and/or the first coding mode, and decodes the first data stream based on the determined first code unit length and/or the first coding mode to obtain the first data.

In some embodiments, the method 200 may further include the following operation.

Scheduling information is sent to the terminal device. The scheduling information is used for the terminal device to determine the first data block size and/or the first code rate.

Exemplarily, before receiving the first data stream, the network device sends the scheduling information to the terminal device.

In some embodiments, the method 200 may further include the following operation.

The first bit number is determined according to a number of resources used for the first data stream and a modulation order corresponding to the first data stream.

Exemplarily, before determining the first code unit length and/or the first coding mode, the network device determines the first bit number according to the number of resources used for the first data stream and the modulation order corresponding to the first data stream, and determines the first code unit length and/or the first coding mode based on the determined first bit number.

Of course, in other alternative embodiments, the network device may also decode, by using multiple code unit lengths and/or multiple coding modes, the first data stream in a blind detection manner to obtain the first data. For example, the network device may also decode, by using multiple code unit lengths and/or multiple coding modes, the first data stream in a traversal manner, and use the verified decoded data as the decoded first data. In an embodiment, the multiple code unit lengths are determined according to pre-configured information, and/or the multiple coding modes are determined according to the pre-configured information.

Preferred embodiments of the present disclosure have been described in detail with reference to the accompanying drawings, but the present disclosure is not limited to the specific details of the above embodiments. Within the scope of the technical conception of the present disclosure, various simple modifications can be made to the technical solutions of the present disclosure, and these simple modifications all belong to the scope of protection of the present disclosure. For example, each of the specific technical features described in the above specific embodiments may be combined in any suitable manner without contradiction, and various possible combinations are not further described in the present disclosure in order to avoid unnecessary repetition. For another example, any combination may be made between the various embodiments of the present disclosure so long as it does not depart from the idea of the present disclosure and is likewise to be regarded as the disclosure of the present disclosure.

It should also be understood that in the various method embodiments of the present disclosure, the size of the sequence number of the above-mentioned processes does not mean the order of execution, and the execution order of the processes should be determined by their functions and inherent logic, and should not be defined in any way by the implementation process of the embodiments of the present disclosure.

The method embodiments of the present disclosure are described in detail above with reference to FIG. 1 to FIG. 15, and the apparatus embodiments of the present disclosure are described in detail below with reference to FIG. 16 to FIG. 18.

Figure 16:
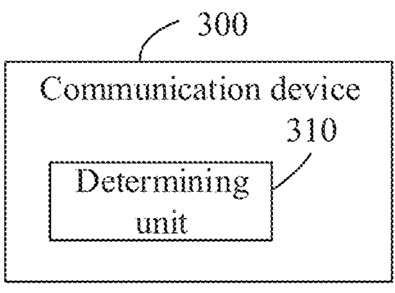
FIG. 16 is a schematic block diagram of a communication device according to an embodiment of the present disclosure.

FIG. 16 is a schematic block diagram of a communication device 300 according to an embodiment of the present disclosure.

As illustrated in FIG. 16, the communication device 300 may include a determining unit 310.

The determining unit 310 is configured to determine, based on first information, a first code unit length used for first data and/or a first coding mode used for the first data. The first information includes at least one of: a first data block size used for the first data, a first code rate used for the first data, or a first bit number corresponding to a first data stream obtained by encoding the first data.

In some embodiments, the determining unit 310 may specifically be configured to: when the first information includes the first data block size, determine a first data block size group to which the first data block size belongs; and determine, based on a first mapping relationship, a code unit length corresponding to the first data block size group as the first code unit length, and/or determine, based on the first mapping relationship, a coding mode corresponding to the first data block size as the first coding mode. The first mapping relationship includes a corresponding relationship between each of at least one data block size group and a respective code unit length and/or a respective coding mode, and the at least one data block size group includes the first data block size group.

In some embodiments, different data block size groups correspond to different coding modes and/or different code unit lengths in the first mapping relationship, or multiple data block size groups correspond to a same coding mode and/or a same code unit length in the first mapping relationship.

In some embodiments, the first mapping relationship is determined from multiple mapping relationships by the communication device.

In some embodiments, the first mapping relationship is determined from the multiple mapping relationships based on related information of a terminal device, and/or the first mapping relationship is determined in the multiple mapping relationships based on information indicated by a network device.

In some embodiments, the determining unit 310 may specifically be configured to: when the first information includes the first code rate, determine a first code rate group to which the first code rate belongs; and determine, based on a second mapping relationship, a code unit length corresponding to the first code rate group as the first code unit length, and/or determine, based on the second mapping relationship, a coding mode corresponding to the first code rate group as the first coding mode. The second mapping relation includes a corresponding relationship between each of at least one code rate group and a respective code unit length and/or a respective coding mode, and the at least one code rate group includes the first code rate group.

In some embodiments, different code rate groups correspond to different coding modes and/or different code unit lengths in the second mapping relationship, or multiple code rate groups correspond to a same coding mode and/or a same code unit length in the second mapping relationship.

In some embodiments, the second mapping relationship is determined from multiple mapping relationships by the communication device.

In some embodiments, the second mapping relationship is determined from the multiple mapping relationships based on related information of a terminal device, and/or the second mapping relationship is determined in the multiple mapping relationships based on information indicated by a network device.

In some embodiments, the determining unit 310 may specifically be configured to: when the first information includes the first data block size and the first code rate, determine a first group to which the first data block size and the first code rate belong; and determine, based on a third mapping relationship, a code unit length corresponding to the first group as the first code unit length, and/or determine, based on the third mapping relationship, a coding mode corresponding to the first group as the first coding mode. The third mapping relationship includes a corresponding relationship between each of at least one group and a respective code unit length and/or a respective coding mode, and the at least one group includes the first group.

In some embodiments, the first group is determined based on a first data block size group to which the first data block size belongs and a first code rate group to which the first code rate belongs.

In some embodiments, the first group is an intersection of a first data block size group to which the first data block size belongs and a first code rate group to which the first code rate belongs, or the first group is a union of the first data block size group to which the first data block size belongs and the first code rate group to which the first code rate belongs.

In some embodiments, the at least one group includes three groups. A data block size(s) in a first group among the three groups is less than $X_1$, or a code rate(s) in the first group is less than $R_1$, $X_1>0$, $R_1>0$; a data block size(s) in a second group among the three groups is greater than or equal to $X_1$ and less than $X_2$, and a code rate(s) in the second group is greater than or equal to $R_1$ and less than $R_2$, $X_2>X_1$, $R_2>R_1$; and a data block size(s) in a third group among the three groups is greater than or equal to $X_2$, or a code rate(s) in the third group is greater than or equal to $R_2$.

In some embodiments, different groups correspond to different coding modes and/or different code unit lengths in the third mapping relationship, or different groups correspond to a same coding mode and/or a same code unit length in the third mapping relationship.

In some embodiments, the third mapping relationship is determined from multiple mapping relationships by the communication device.

In some embodiments, the third mapping relationship is determined from the multiple mapping relationships based on related information of a terminal device, and/or the third mapping relationship is determined in the multiple mapping relationships based on information indicated by a network device.

In some embodiments, the determining unit 310 may specifically be configured to: when the first information includes the first bit number, determine a first bit number group to which the first bit number belongs; and determine, based on a fourth mapping relationship, a code unit length corresponding to the first bit number group as the first code unit length, and/or determine, based on the fourth mapping relationship, a coding mode corresponding to the first bit number group as the first coding mode. The fourth mapping relationship includes a corresponding relationship between each of at least one bit number group and a respective code unit length and/or a respective coding mode, and the at least one bit number group includes the first bit number group.

In some embodiments, different bit number groups correspond to different coding modes and/or different code unit lengths in the fourth mapping relationship, or multiple bit number groups correspond to a same coding mode and/or a same code unit length in the fourth mapping relationship.

In some embodiments, the fourth mapping relationship is determined from multiple mapping relationships by the communication device.

In some embodiments, the fourth mapping relationship is determined from the multiple mapping relationships based on related information of a terminal device, and/or the fourth mapping relationship is determined in the multiple mapping relationships based on information indicated by a network device.

In some embodiments, the first data stream is a bit stream after rate matching.

In some embodiments, the communication device 300 is the terminal device, and the determining unit 310 may further be configured to: encode, by using the first code unit length and/or the first coding mode, the first data to obtain the first data stream; and send the first data stream to a network device.

In some embodiments, the determining unit 310 may further be configured to receive scheduling information sent by the network device. The scheduling information is used for indicating the first data block size and/or the first code rate.

In some embodiments, the communication device 300 is a network device, and the determining unit 310 may further be configured to: receive the first data stream sent by a terminal device; and decode, by using the first code unit length and/or the first coding mode, the first data stream to obtain the first data.

In some embodiments, the determining unit 310 may further be configured to: send scheduling information to the terminal device. The scheduling information is used for the terminal device to determine the first data block size and/or the first code rate.

In some embodiments, the determining unit 310 may further be configured to: determine the first bit number according to a number of resources used for the first data stream and a modulation order corresponding to the first data stream.

It should be understood that the apparatus embodiments and the method embodiments may correspond to each other, and reference to similar descriptions of the apparatus embodiments may be made to the method embodiments. In particular, the communication device 300 illustrated in FIG. 16 may correspond to a respective body in the method 200 of the embodiment of the present disclosure, and the foregoing and other operations and/or functions of various units in the communication device 300 are respectively used to implement corresponding flows in various methods provided in the embodiments of the present disclosure, and will not be repeated here for the sake of brevity.

The communication device of the embodiments of the present disclosure is described above from the perspective of functional modules with reference to the accompanying drawings. It should be understood that the functional modules may be implemented in hardware form, by instructions in software form, or by a combination of hardware and software modules. In particular, each operation of the method embodiments in the embodiments of the present disclosure can be completed by the integrated logic circuit of the hardware in the processor and/or the instruction in the form of software, and the operations of the method disclosed in combination with the embodiments of the present disclosure can be directly embodied as being executed and completed by a hardware decoding processor or can be executed and completed by a combination of the hardware and software modules in the decoding processor. In an embodiment, the software module may be located in a Random Access Memory (RAM), a flash memory, a Read-Only Memory (ROM), a programmable read-only memory, an electrically erasable programmable memory, a register or other storage media mature in the art. The storage medium is located in the memory, and the processor reads the information in the memory and completes the operations in the method embodiments in combination with its hardware.

For example, the determining unit 310 referred to above may be implemented by processors respectively.

Figure 17:
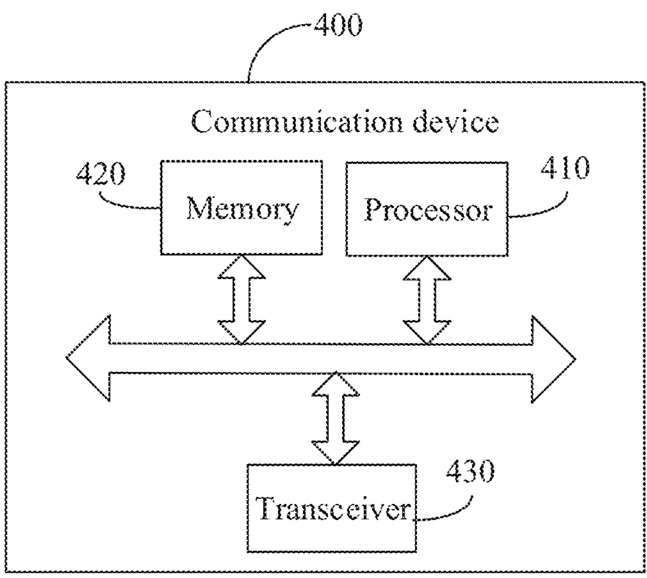
FIG. 17 is a schematic block diagram of a communication device according to an embodiment of the present disclosure.

FIG. 17 is a schematic diagram of a structure of a communication device 400 according to an embodiment of the present disclosure.

As illustrated in FIG. 17, the communication device 400 may include a processor 410.

The processor 410 may invoke and run a computer program from a memory to implement the method in the embodiments of the present disclosure.

As illustrated in FIG. 17, the communication device 400 may further include a memory 420.

The memory 420 may be used for storing indication information and may also be used for storing codes, instructions and the like executed by the processor 410. The processor 410 may invoke and run a computer program from the memory 420 to implement the method in the embodiments of the present disclosure. The memory 420 may be a separate device independent of the processor 410 or may be integrated within the processor 410.

As illustrated in FIG. 17, the communication device 400 may further include a transceiver 430.

The processor 410 may control the transceiver 430 to communicate with other devices, and in particular may send information or data to other devices or receive information or data sent by other devices. The transceiver 430 may include a transmitter and a receiver. The transceiver 430 may further include antennas, the number of which may be one or more.

It should be understood that the various components in the communication device 400 are connected by a bus system. The bus system includes a power bus, a control bus and a state signal bus, in addition to a data bus.

It should also be understood that the communication device 400 may implement the corresponding flows implemented by the communication device in the various methods of the embodiments of the present disclosure. That is, the communication device 400 of the embodiments of the present disclosure may correspond to the communication device 300 of the embodiments of the present disclosure and may correspond to a respective body for performing the method 200 according to the embodiments of the present disclosure, which will not be repeated here for the sake of brevity.

In addition, the embodiment of the present disclosure further provides a chip.

For example, the chip may be an integrated circuit chip having signal processing capabilities that can implement or perform the methods, operations and logic diagrams disclosed in the embodiments of the present disclosure. The chip may also be referred to as a system-level chip, a system chip, a chip system or a chip-on system chip, etc. In an embodiment, the chip can be applied to various communication devices, so that the communication device mounted with the chip can perform the methods, operations and logic block diagrams disclosed in the embodiments of the present disclosure.

Figure 18:
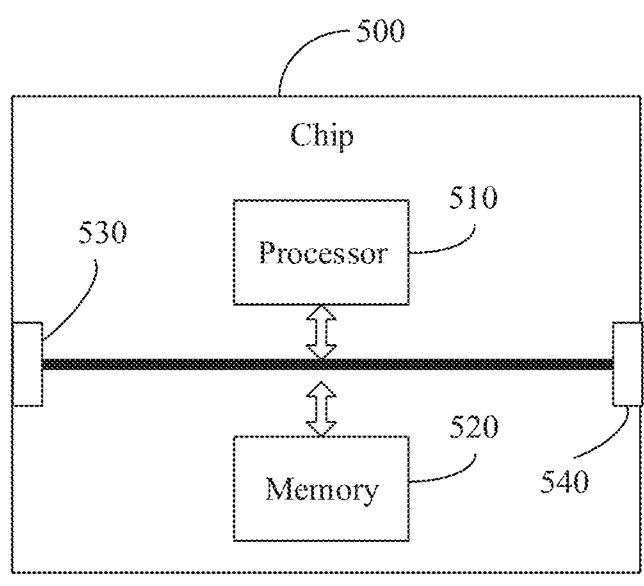
FIG. 18 is a schematic block diagram of a chip according to an embodiment of the present disclosure.

FIG. 18 is a schematic diagram of a structure of a chip 500 according to an embodiment of the present disclosure.

As illustrated in FIG. 18, the chip 500 includes a processor 510.

The processor 510 may invoke and run a computer program from a memory to implement the method in the embodiments of the present disclosure.

As illustrated in FIG. 18, the chip 500 may further include a memory 520.

The processor 510 may invoke and run a computer program from the memory 520 to implement the method in the embodiments of the present disclosure. The memory 520 may be used to store indication information and may also be used to store codes, instructions and the like executed by the processor 510. The memory 520 may be a separate device independent of the processor 510 or may be integrated within the processor 510.

As illustrated in FIG. 18, the chip 500 may further include an input interface 530.

The processor 510 may control the input interface 530 to communicate with other devices or chips, and in particular may obtain information or data sent by other devices or chips.

As illustrated in FIG. 18, the chip 500 may further include an output interface 540.

The processor 510 may control the output interface 540 to communicate with other devices or chips, and in particular may output information or data to other devices or chips.

It should be understood that the chip 500 may be applied to the communication device in the embodiments of the present disclosure, and the chip may implement the corresponding flows implemented by the communication device in various methods of the embodiments of the present disclosure, that is, may implement the corresponding flows implemented by the terminal device or the network device in the various methods of the embodiments of the present disclosure, which will not be repeated here for the sake of brevity.

It should also be understood that the various components in the chip 500 are connected by a bus system. The bus system includes a power bus, a control bus and a state signal bus, in addition to a data bus.

The processor referred to above may include, but is not limited to, the followings:

- a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components and so on.

The processor may be used to implement or perform the methods, operations, and logic diagrams disclosed in the embodiments of the present disclosure. The operations of the method disclosed in combination with the embodiments of the present disclosure can be directly embodied as being executed and completed by a hardware decoding processor or can be executed and completed by a combination of the hardware and software modules in the decoding processor. The software module may be located in a random access memory, a flash memory, a read only memory, a programmable read-only memory, an erasable programmable memory, a register and other storage media mature in the art. The storage medium is located in the memory, and the processor reads the information in the memory and completes the operations of the method in combination with its hardware.

The memory referred to above includes, but is not limited to, a volatile memory and/or a nonvolatile memory. The nonvolatile memory may be an ROM, a Programmable ROM (PROM), an Erasable PROM (EPROM), an Electrically Erasable EPROM (EEPROM), or a flash memory. The volatile memory may be an RAM which serves as an external cache. By way of illustration, but not limitation, many forms of RAM are available, such as a static RAM (SRAM), a dynamic RAM (DRAM), a synchronous DRAM (SDRAM), a double data rate SDRAM (DDR SDRAM), an Enhanced SDRAM (ESDRAM), a synch link DRAM (SL-DRAM), and a direct Rambus RAM (DR RAM).

It should be noted that the memory described herein is intended to include these and any other suitable types of memories.

An embodiment of the present disclosure further provides a computer-readable storage medium for storing a computer program. The computer-readable storage medium stores one or more programs including instructions that, when executed by a portable electronic device including multiple application programs, cause the portable electronic device to perform the method for data transmission according to the present disclosure. Optionally, the computer-readable storage medium can be applied to the communication device in the embodiments of the present disclosure, and the computer program causes the computer to perform corresponding flows implemented by the communication device in various methods of the embodiments of the present disclosure, which will not be repeated here for the sake of brevity.

An embodiment of the present disclosure further provides a computer program product, which includes a computer program. Optionally, the computer program product may be applied to the communication device in the embodiments of the present disclosure, and the computer program causes the computer to perform corresponding flows implemented by the communication device in various methods of the embodiments of the present disclosure, which will not be repeated here for the sake of brevity.

An embodiment of the present disclosure further provides a computer program. When the computer program is executed by a computer, the computer is caused to perform the method for data transmission according to the present disclosure. Optionally, the computer program can be applied to the communication device in the embodiments of the present disclosure, and when the computer program is run on the computer, the computer is caused to perform corresponding flows implemented by the communication device in various methods of the embodiments of the present disclosure, which will not be repeated here for the sake of brevity.

An embodiment of the present disclosure further provides a communication system. The communication system may include the above-mentioned terminal device and the network device to form the communication system as illustrated in FIG. 1 which will not be repeated here for the sake of brevity. It should be noted that the term "system" in the present disclosure can also be referred to as "network management architecture" or "network system".

Based on the technical solutions of the embodiments of the disclosure, the communication device determines a first code unit length used for first data and/or a first coding mode used for the first data based on first information, the first information being designed to include at least one of: a first data block size used for the first data, a first code rate used for the first data, or a first bit number corresponding to a first data stream obtained by encoding the first data, which enables the cellular IoT to be compatible with the communication mode of the zero-power terminal. That is, the cellular IoT is enabled to be compatible with the zero-power terminal, which can enrich the type and number of linked terminals in the network, so as to truly realize the Internet of Everything.

In addition, the communication device determines, based on first information, a first code unit length used for first data and/or a first coding mode used for the first data, which is equivalent that the first coding mode and/or the first code unit length are associated with the first information. When the first data block sizes, the first code rates or the first bit numbers are different, the first code unit lengths and/or the first coding modes determined by the communication device based on the first data block sizes, the first code rates or the first bit numbers may be different. That is to say, the communication device can adaptively adjust the first code unit length and/or the first coding mode based on the first information, which facilitates improvement of the reliability of data transmission or data transmission rate and facilitates the interference deletion processing at a receiving end, thereby improving the data transmission performance and the integrity of data transmission.

It should also be understood that the term used in the embodiments of the present disclosure and the appended claims is for the purpose of describing specific embodiments only and is not intended to limit the embodiments of the present disclosure. For example, the singular forms of "an," "said," "mentioned" and "the" as used in the embodiments of the present disclosure and the appended claims are also intended to include multiple forms, unless clearly dictated in the context otherwise.

Those skilled in the art will appreciate that the various example units and algorithm operations described in connection with the embodiments disclosed herein can be implemented in electronic hardware or in a combination of computer software and electronic hardware. Whether these functions are performed in hardware or software depends on the specific application and design constraints of the technical solutions. Skilled artisans may use different methods for each particular application to implement the described functionality, but such implementation should not be considered beyond the scope of the embodiments of the present disclosure. If the function is implemented in the form of a software functional unit and is sold or used as an independent product, it can be stored in a computer readable storage medium. Based on such an understanding, the technical solution of the disclosure or the part that contributes to the related art or the part of the technical solution may be embodied in the form of a software product essentially, and the computer software product is stored in a storage medium including several indications to make a computer device (which may be a personal computer, a server or a network device, etc.) execute all or part of the operations of the methods described in the each embodiment of the disclosure. The aforementioned storage medium includes: U disks, mobile hard disks, ROMs, RAMs, magnetic disks or optical disks and other media that can store program codes.

Those skilled in the art will also appreciate that, for the sake of convenience and brevity of description, for specific operating processes of the above-described systems, apparatuses, and units, the corresponding flow in the foregoing method embodiments may be referred to and will not be repeated herein. In several embodiments according to the present disclosure, it should be understood that the disclosed systems, apparatuses and methods may be implemented in other ways. For example, the partition of units or modules or components in the above-described apparatus embodiments is only a logical functional partition, which may be implemented in another way in the actual implementation. For example, multiple units or modules or components may be combined or integrated into another system, or some units or modules or components may be ignored or not performed. For another example, the units/modules/components described above as separation/display means may or may not be physically separated, i.e., may be located in one place, or may be distributed over multiple network elements. Some or all of the units/modules/components may be selected according to actual needs to achieve the object of the embodiments of the present disclosure. Finally, it should be noted that the coupling, or direct coupling or communication connection between each other illustrated or discussed above may be indirect coupling or communication connection through some interfaces, apparatuses or units, and may be electrical, mechanical or other form.

The foregoing descriptions are merely specific embodiments of the present disclosure, but the protection scope of the present disclosure is not limited thereto. Any change or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for data transmission, performed by a communication device and comprising:

determining, based on first information, a first code unit length used for first data and/or a first coding mode used for the first data;

wherein the first information comprises at least one of: a first data block size used for the first data, a first code rate used for the first data, or a first bit number corresponding to a first data stream obtained by encoding the first data, wherein determining, based on the first information, the first code unit length used for the first data and/or the first coding mode used for the first data comprises:

when the first information comprises the first data block size, determining a first data block size group to which the first data block size belongs; and determining, based on a first mapping relationship, a code unit length corresponding to the first data block size group as the first code unit length, and/or determining, based on the first mapping relationship, a coding mode corresponding to the first data block size as the first coding mode;

wherein the first mapping relationship comprises a corresponding relationship between each of at least one data block size group and a respective code unit length and/or a respective coding mode, and the at least one data block size group comprises the first data block size group.

2. The method of claim 1, wherein determining, based on the first information, the first code unit length used for the first data and/or the first coding mode used for the first data comprises:

when the first information comprises the first code rate, determining a first code rate group to which the first code rate belongs; and determining, based on a second mapping relationship, a code unit length corresponding to the first code rate group as the first code unit length, and/or determining, based on the second mapping relationship, a coding mode corresponding to the first code rate group as the first coding mode;

wherein the second mapping relation comprises a corresponding relationship between each of at least one code rate group and a respective code unit length and/or a respective coding mode, and the at least one code rate group comprises the first code rate group.

3. The method of claim 1, wherein determining, based on the first information, the first code unit length used for the first data and/or the first coding mode used for the first data comprises:

when the first information comprises the first data block size and the first code rate, determining a first group to which the first data block size and the first code rate belong; and determining, based on a third mapping relationship, a code unit length corresponding to the first group as the first code unit length, and/or determining, based on the third mapping relationship, a coding mode corresponding to the first group as the first coding mode;

wherein the third mapping relationship comprises a corresponding relationship between each of at least one group and a respective code unit length and/or a respective coding mode, and the at least one group comprises the first group.

4. The method of claim 1, wherein determining, based on the first information, the first code unit length used for the first data and/or the first coding mode used for the first data comprises:

when the first information comprises the first bit number, determining a first bit number group to which the first bit number belongs; and determining, based on a fourth mapping relationship, a code unit length corresponding to the first bit number group as the first code unit length, and/or determining, based on the fourth mapping relationship, a coding mode corresponding to the first bit number group as the first coding mode;

wherein the fourth mapping relationship comprises a corresponding relationship between each of at least one bit number group and a respective code unit length and/or a respective coding mode, and the at least one bit number group comprises the first bit number group.

5. The method of claim 1, wherein the first data stream is a bit stream after rate matching.

6. The method of claim 1, wherein the communication device is a terminal device, and the method further comprises:

encoding, by using the first code unit length and/or the first coding mode, the first data to obtain the first data stream; and sending the first data stream to a network device.

7. The method of claim 6, further comprising:

receiving scheduling information sent by the network device, wherein the scheduling information is used for indicating the first data block size and/or the first code rate.

8. The method of claim 1, wherein the communication device is a network device, and the method further comprises:

receiving the first data stream sent by a terminal device; and decoding, by using the first code unit length and/or the first coding mode, the first data stream to obtain the first data.

9. The method of claim 8, further comprising:

sending scheduling information to the terminal device, wherein the scheduling information is used for the terminal device to determine the first data block size and/or the first code rate.

10. The method of claim 8, further comprising:

determining the first bit number according to a number of resources used for the first data stream and a modulation order corresponding to the first data stream.

11. A communication device, comprising:

a processor, configured to determine, based on first information, a first code unit length used for first data and/or a first coding mode used for the first data;

wherein the first information comprises at least one of: a first data block size used for the first data, a first code rate used for the first data, or a first bit number corresponding to a first data stream obtained by encoding the first data, wherein the processor is specifically configured to:

when the first information comprises the first data block size, determine a first data block size group to which the first data block size belongs; and determine, based on a first mapping relationship, a code unit length corresponding to the first data block size group as the first code unit length, and/or determine, based on the first mapping relationship, a coding mode corresponding to the first data block size as the first coding mode;

wherein the first mapping relationship comprises a corresponding relationship between each of at least one data block size group and a respective code unit length and/or a respective coding mode, and the at least one data block size group comprises the first data block size group.

12. The communication device of claim 11, wherein the processor is specifically configured to:

when the first information comprises the first code rate, determine a first code rate group to which the first code rate belongs; and determine, based on a second mapping relationship, a code unit length corresponding to the first code rate group as the first code unit length, and/or determine, based on the second mapping relationship, a coding mode corresponding to the first code rate group as the first coding mode;

wherein the second mapping relationship comprises a corresponding relationship between each of at least one code rate group and a respective code unit length and/or a respective coding mode, and the at least one code rate group comprises the first code rate group.

13. The communication device of claim 11, wherein the processor is specifically configured to:

when the first information comprises the first data block size and the first code rate, determine a first group to which the first data block size and the first code rate belong; and determine, based on a third mapping relationship, a code unit length corresponding to the first group as the first code unit length, and/or determine, based on the third mapping relationship, a coding mode corresponding to the first group as the first coding mode;

wherein the third mapping relationship comprises a corresponding relationship between each of at least one group and a respective code unit length and/or a respective coding mode, and the at least one group comprises the first group.

14. The communication device of claim 11, wherein the processor is specifically configured to:

when the first information comprises the first bit number, determine a first bit number group to which the first bit number belongs; and determine, based on a fourth mapping relationship, a code unit length corresponding to the first bit number group as the first code unit length, and/or determine, based on the fourth mapping relationship, a coding mode corresponding to the first bit number group as the first coding mode;

wherein the fourth mapping relationship comprises a corresponding relationship between each of at least one bit number group and a respective code unit length and/or a respective coding mode, and the at least one bit number group comprises the first bit number group.

15. The communication device of claim 11, wherein the first data stream is a bit stream after rate matching.

16. The communication device of claim 11, wherein the communication device is a terminal device, and the processor is further configured to:

encode, by using the first code unit length and/or the first coding mode, the first data to obtain the first data stream; and control a transceiver comprised in the communication device to send the first data stream to a network device.

17. The communication device of claim 16, wherein the processor is further configured to:

control the transceiver comprised in the communication device to receive scheduling information sent by the network device, wherein the scheduling information is used for indicating the first data block size and/or the first code rate.

18. The communication device of claim 11, wherein the communication device is a network device, and the processor is further configured to:

control a transceiver comprised in the communication device to receive the first data stream sent by a terminal device; and decode, by using the first code unit length and/or the first coding mode, the first data stream to obtain the first data.

19. The communication device of claim 18, wherein the processor is further configured to:

control the transceiver comprised in the communication device to send scheduling information to the terminal device, wherein the scheduling information is used for the terminal device to determine the first data block size and/or the first code rate.

20. A chip, comprising:

a processor, configured to invoke and run a computer program from a memory to cause a device installed with the chip to perform:

determining, based on first information, a first code unit length used for first data and/or a first coding mode used for the first data;

wherein the first information comprises at least one of: a first data block size used for the first data, a first code rate used for the first data, or a first bit number corresponding to a first data stream obtained by encoding the first data, wherein the processor is specifically configured to:

when the first information comprises the first data block size, determine a first data block size group to which the first data block size belongs; and determine, based on a first mapping relationship, a code unit length corresponding to the first data block size group as the first code unit length, and/or determine, based on the first mapping relationship, a coding mode corresponding to the first data block size as the first coding mode;

wherein the first mapping relationship comprises a corresponding relationship between each of at least one data block size group and a respective code unit length and/or a respective coding mode, and the at least one data block size group comprises the first data block size group.

* * * * *